(12) United States Patent
Wolf et al.

(10) Patent No.: US 12,459,512 B2
(45) Date of Patent: Nov. 4, 2025

(54) REFUSE VEHICLE WITH MULTI-FUNCTIONAL PEDAL

(71) Applicant: Oshkosh Corporation, Oshkosh, WI (US)

(72) Inventors: Ryan Wolf, Oshkosh, WI (US); Jeremy Andringa, Oshkosh, WI (US); Amanda Miller, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 124 days.

(21) Appl. No.: 18/215,044

(22) Filed: Jun. 27, 2023

(65) Prior Publication Data

US 2023/0415742 A1 Dec. 28, 2023

Related U.S. Application Data

(60) Provisional application No. 63/356,209, filed on Jun. 28, 2022.

(51) Int. Cl.
*B60W 30/18* (2012.01)
*B60W 10/08* (2006.01)
*B60W 10/184* (2012.01)

(52) U.S. Cl.
CPC ...... *B60W 30/18127* (2013.01); *B60W 10/08* (2013.01); *B60W 10/184* (2013.01); *B60W 2300/12* (2013.01); *B60W 2540/103* (2013.01); *B60W 2540/12* (2013.01); *B60W 2710/083* (2013.01)

(58) Field of Classification Search
CPC .............................................. B60W 30/18127
See application file for complete search history.

(56) References Cited

U.S. PATENT DOCUMENTS

| | | | |
|---|---|---|---|
| 6,882,917 B2* | 4/2005 | Pillar ...................... | B60L 50/15 |
| | | | 701/48 |
| 9,067,500 B2* | 6/2015 | Penev ....................... | F03D 9/32 |
| 9,902,390 B2* | 2/2018 | Hashimoto ..... | B60W 30/18127 |
| 11,993,457 B2* | 5/2024 | Turner .................... | B60L 1/003 |
| 2004/0002794 A1 | 1/2004 | Pillar et al. | |
| 2005/0113996 A1 | 5/2005 | Pillar et al. | |
| 2005/0234622 A1 | 10/2005 | Pillar et al. | |
| 2008/0114513 A1 | 5/2008 | Pillar et al. | |
| 2011/0202248 A1* | 8/2011 | Klausner ............... | B60W 10/08 |
| | | | 701/70 |

(Continued)

*Primary Examiner* — Michael A Berns
(74) *Attorney, Agent, or Firm* — Foley & Lardner LLP

(57) ABSTRACT

A refuse vehicle includes a motor, a battery, a pedal, and processing circuitry. The motor consumes electrical energy transport the refuse vehicle, or is back-driven to generate electrical energy and provide regenerative braking. The processing circuitry obtains an amount of depression from the pedal, and compares the amount of depression to a transition point. In response to the amount of depression of the pedal exceeding the transition point, the processing circuitry uses a linear relationship and the amount of depression to operate the motor to provide a requested amount of acceleration for transportation. In response to the amount of depression of the pedal being less than the transition point, the processing circuitry uses a non-linear relationship and the amount of depression of the pedal to operate the motor to provide a requested amount of regenerative braking.

16 Claims, 19 Drawing Sheets

(56) References Cited

U.S. PATENT DOCUMENTS

| | | |
|---|---|---|
| 2015/0151651 A1 | 6/2015 | Stingle et al. |
| 2015/0210313 A1 | 7/2015 | Sears et al. |
| 2019/0276102 A1 | 9/2019 | Zuleger et al. |
| 2020/0290236 A1 | 9/2020 | Bjornstad et al. |
| 2020/0290237 A1 | 9/2020 | Steffens et al. |
| 2020/0290238 A1 | 9/2020 | Andringa et al. |
| 2020/0291846 A1 | 9/2020 | Steffens et al. |
| 2021/0121340 A1 | 4/2021 | Malcolm et al. |
| 2021/0171137 A1 | 6/2021 | Zuleger et al. |
| 2021/0276423 A1 | 9/2021 | Lombardo et al. |
| 2021/0276643 A1 | 9/2021 | Ellifson et al. |
| 2021/0276847 A1 | 9/2021 | Neubauer et al. |
| 2021/0276848 A1 | 9/2021 | Miller et al. |
| 2021/0354329 A1 | 11/2021 | Hou et al. |
| 2021/0369515 A1 | 12/2021 | Malcolm et al. |
| 2022/0000686 A1 | 1/2022 | Malcolm et al. |
| 2022/0072736 A1 | 3/2022 | Steffens et al. |
| 2022/0118854 A1 | 4/2022 | Davis et al. |
| 2022/0134372 A1 | 5/2022 | Andringa |
| 2022/0134856 A1 | 5/2022 | Andringa et al. |
| 2022/0135385 A1 | 5/2022 | Lombardo et al. |
| 2022/0204332 A1 | 6/2022 | Miller et al. |
| 2022/0211560 A1 | 7/2022 | Malcolm et al. |
| 2022/0234873 A1 | 7/2022 | Miller et al. |
| 2022/0289290 A1 | 9/2022 | Andringa et al. |
| 2023/0070279 A1 | 3/2023 | Wheeler et al. |
| 2023/0070769 A1 | 3/2023 | Wheeler et al. |
| 2023/0074504 A1 | 3/2023 | Ellifson et al. |
| 2023/0150584 A1 | 5/2023 | Zeamer et al. |
| 2023/0150763 A1 | 5/2023 | Haberlein et al. |
| 2023/0174178 A1 | 6/2023 | Andringa |
| 2023/0191887 A1 | 6/2023 | Rausch et al. |
| 2023/0192401 A1 | 6/2023 | Zeamer et al. |
| 2023/0211705 A1 | 7/2023 | Zeamer et al. |
| 2023/0278425 A1 | 9/2023 | Miller et al. |
| 2023/0311666 A1* | 10/2023 | Miller ................. B60L 3/12 |
| | | 701/22 |
| 2023/0415742 A1* | 12/2023 | Wolf ............. B60W 10/184 |

* cited by examiner

REFUSE VEHICLE WITH MULTI-FUNCTIONAL PEDAL

CROSS-REFERENCE TO RELATED PATENT APPLICATION

This application claims the benefit of and priority to U.S. Provisional Application No. 63/356,209, filed Jun. 28, 2022, the entire disclosure of which is incorporated by reference herein.

BACKGROUND

The present disclosure relates generally to vehicles. More specifically, the present disclosure relates to an alert system for a commercial vehicle.

SUMMARY

One implementation of the present disclosure is a refuse vehicle, according to some embodiments. In some embodiments, the refuse vehicle includes a drive motor, a battery, a pedal, and processing circuitry. In some embodiments, the drive motor is configured to consume electrical energy to drive a tractive element to transport the refuse vehicle, or be back-driven by the tractive element to generate electrical energy and provide regenerative braking. In some embodiments, the battery is configured to provide the electrical energy to the drive motor for transportation and receive electrical energy from the drive motor and charge using the electrical energy during regenerative braking of the refuse vehicle. In some embodiments, the pedal is configured to be depressed by an operator of the refuse vehicle. In some embodiments, the processing circuitry is configured to obtain an amount of depression from the pedal, and compare the amount of depression to a transition point. In response to the amount of depression of the pedal exceeding the transition point, the processing circuitry is configured to use a linear relationship and the amount of depression of the pedal to determine a requested amount of acceleration and operate the drive motor to provide the requested amount of acceleration for transportation. In response to the amount of depression of the pedal being less than the transition point, the processing circuitry is configured to use a non-linear relationship and the amount of depression of the pedal to determine a requested amount of regenerative braking and operate the drive motor to provide the requested amount of regenerative braking.

In some embodiments, the processing circuitry is configured to use the linear relationship and the amount of depression of the pedal to determine the requested amount of acceleration and operate the drive motor to provide the requested amount of acceleration for transportation in response to the amount of depression of the pedal exceeding the transition point by at least a deadband amount.

In some embodiments, the processing circuitry is configured to use the non-linear relationship and the amount of depression of the pedal to determine a requested amount of regenerative braking and operate the drive motor to provide the requested amount of regenerative braking in response to the amount of depression of the pedal being less than the transition point by at least a deadband amount. In some embodiments, the non-linear relationship is a sigmoid function. In some embodiments, the transition point is 20% of a total depression of the pedal.

Another implementation of the present disclosure is a refuse vehicle including a drive motor, a battery, and a pedal, according to some embodiments. The drive motor is configured to operate according to (i) a drive mode in which the drive motor consumes electrical energy to drive a tractive element to transport the refuse vehicle, or (ii) a regenerative braking mode in which the drive motor is driven by the tractive element to generate electrical energy and provide regenerative braking. In some embodiments, battery is configured to provide the electrical energy to the drive motor for transportation and receive electrical energy from the drive motor and charge using the electrical energy during regenerative braking of the refuse vehicle. In some embodiments, the pedal is configured to be depressed by an operator of the refuse vehicle. In some embodiments, depression of the pedal across a first range of positions causes the drive motor to operate according to the drive mode to drive the tractive element for transportation. In some embodiments, depression of the pedal across a second range of positions causes the drive motor to operate according to the regenerative braking mode to be driven by the tractive element for generation of electrical energy and regenerative braking.

In some embodiments, the refuse vehicle includes processing circuitry. In some embodiments, the processing circuitry is configured to obtain an amount of depression from the pedal. In some embodiments, the processing circuitry is configured to, responsive to the amount of depression of the pedal indicating that the pedal is within the first range of positions, operate the drive motor according to the drive mode based on the amount of depression of the pedal. In some embodiments, the processing circuitry is configured to, responsive to the amount of depression of the pedal indicating that the pedal is within the second range of positions, operate the drive motor according to the regenerative braking mode based on the amount of depression of the pedal.

In some embodiments, the processing circuitry is configured to compare the amount of depression to a transition point. In some embodiments, the processing circuitry is configured to, in response to the amount of depression of the pedal exceeding the transition point, use a linear relationship and the amount of depression of the pedal to determine a requested amount of acceleration and operate the drive motor according to the drive mode to provide the requested amount of acceleration for transportation. In some embodiments, the processing circuitry is configured to, in response to the amount of depression of the pedal being less than the transition point, use a non-linear relationship and the amount of depression of the pedal to determine a requested amount of regenerative braking and operate the drive motor to provide the requested amount of regenerative braking.

In some embodiments, the processing circuitry is configured to use the non-linear relationship and the amount of depression of the pedal to determine a requested amount of regenerative braking and operate the drive motor to provide the requested amount of regenerative braking in response to the amount of depression of the pedal being less than the transition point by at least a deadband amount. In some embodiments, the non-linear relationship is a sigmoid function.

In some embodiments, the processing circuitry is configured to use the linear relationship and the amount of depression of the pedal to determine the requested amount of acceleration and operate the drive motor to provide the requested amount of acceleration for transportation in response to the amount of depression of the pedal exceeding the transition point by at least a deadband amount. In some embodiments, the transition point is 20% of a total depression of the pedal.

In some embodiments, the refuse vehicle includes a friction brake and a brake pedal. In some embodiments, the friction brake is configured to apply a frictional braking force to the tractive element. In some embodiments, depression of the brake pedal results in the friction brake applying the frictional braking force to the tractive element.

Another implementation of the present disclosure is a system for a vehicle, according to some embodiments. In some embodiments, the system includes a drive motor, a battery, and a pedal. In some embodiments, the drive motor is configured to operate according to (i) a drive mode in which the drive motor consumes electrical energy to drive a tractive element to transport the vehicle. In some embodiments, the drive motor is configured to operate according to (ii) a regenerative braking mode in which the drive motor is driven by the tractive element to generate electrical energy and provide regenerative braking. In some embodiments, the battery is configured to provide the electrical energy to the drive motor for transportation and receive electrical energy from the drive motor and charge using the electrical energy during regenerative braking of the vehicle. In some embodiments, the pedal is configured to be depressed by an operator of the vehicle. In some embodiments, depression of the pedal across a first range of positions causes the drive motor to operate according to the drive mode to drive the tractive element for transportation. In some embodiments, depression of the pedal across a second range of positions causes the drive motor to operate according to the regenerative braking mode to be driven by the tractive element for generation of electrical energy and regenerative braking.

In some embodiments, the system includes processing circuitry. In some embodiments, the processing circuitry is configured to obtain an amount of depression from the pedal. In some embodiments, the processing circuitry is configured to, responsive to the amount of depression of the pedal indicating that the pedal is within the first range of positions, operate the drive motor according to the drive mode based on the amount of depression of the pedal. In some embodiments, the processing circuitry is configured to, responsive to the amount of depression of the pedal indicating that the pedal is within the second range of positions, operate the drive motor according to the regenerative braking mode based on the amount of depression of the pedal.

In some embodiments, the processing circuitry is configured to compare the amount of depression to a transition point. In some embodiments, the processing circuitry is configured to, in response to the amount of depression of the pedal exceeding the transition point, use a linear relationship and the amount of depression of the pedal to determine a requested amount of acceleration and operate the drive motor according to the drive mode to provide the requested amount of acceleration for transportation.

In some embodiments, the processing circuitry is configured to, in response to the amount of depression of the pedal being less than the transition point, use a non-linear relationship and the amount of depression of the pedal to determine a requested amount of regenerative braking and operate the drive motor to provide the requested amount of regenerative braking. In some embodiments, the processing circuitry is configured to use the non-linear relationship and the amount of depression of the pedal to determine a requested amount of regenerative braking and operate the drive motor to provide the requested amount of regenerative braking in response to the amount of depression of the pedal being less than the transition point by at least a deadband amount.

In some embodiments, the non-linear relationship is a sigmoid function. In some embodiments, the processing circuitry is configured to use the linear relationship and the amount of depression of the pedal to determine the requested amount of acceleration and operate the drive motor to provide the requested amount of acceleration for transportation in response to the amount of depression of the pedal exceeding the transition point by at least a deadband amount.

In some embodiments, the transition point is 20% of a total depression of the pedal. In some embodiments, the system includes a friction brake and a brake pedal. In some embodiments, the friction brake is configured to apply a frictional braking force to the tractive element. In some embodiments, depression of the brake pedal results in the friction brake applying the frictional braking force to the tractive element.

Another implementation of the present disclosure is a method for controlling regenerative braking and acceleration of a vehicle, according to some embodiments. In some embodiments, the method includes obtaining a signal from a pedal indicating an amount of depression of the pedal. In some embodiments, the method includes comparing the amount of depression of the pedal to a transition point. In some embodiments, the method includes, responsive to the amount of depression being less than the transition point, operating a drive motor of the vehicle to provide an amount regenerative braking to a tractive element of the vehicle based on the amount of depression of the pedal. In some embodiments, the method includes, responsive to the amount of depression being greater than the transition point, operating the drive motor of the vehicle to drive the tractive element of the vehicle to transport the vehicle based on the amount of depression of the pedal.

In some embodiments, the method includes operating the drive motor of the vehicle to provide the amount of regenerative braking includes using a non-linear relationship and the amount of depression of the pedal to determine a requested amount of regenerative braking and operating the drive motor according to a regenerative braking mode to provide the requested amount of regenerative braking. In some embodiments, operating the drive motor of the vehicle to drive the tractive element includes using a linear relationship and the amount of depression of the pedal to determine a requested amount of acceleration and operating the drive motor according to a drive mode to provide the requested amount of acceleration for transportation.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
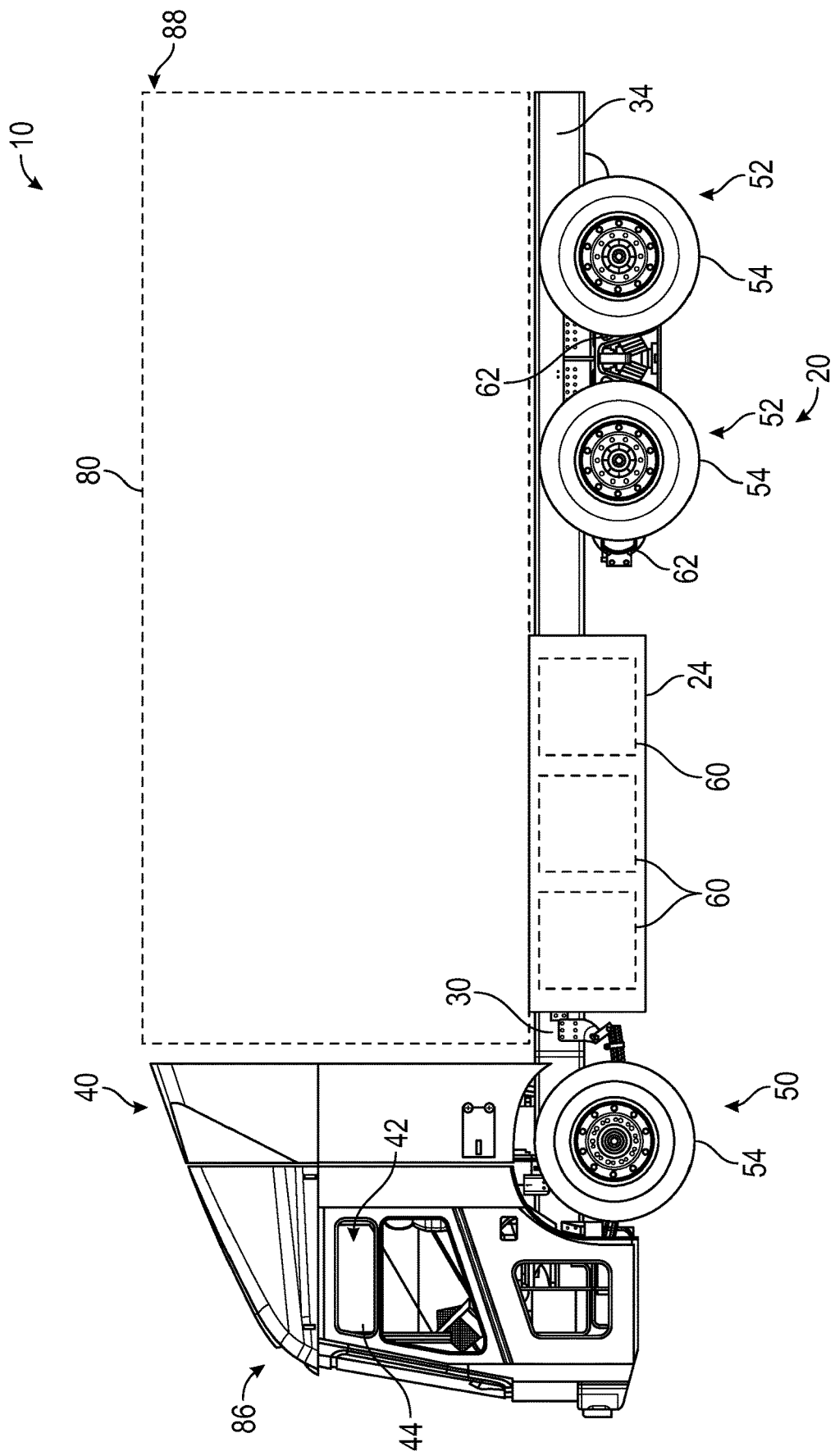
FIG. 1 is a left side view of a vehicle, according to an exemplary embodiment.
Figure 2:
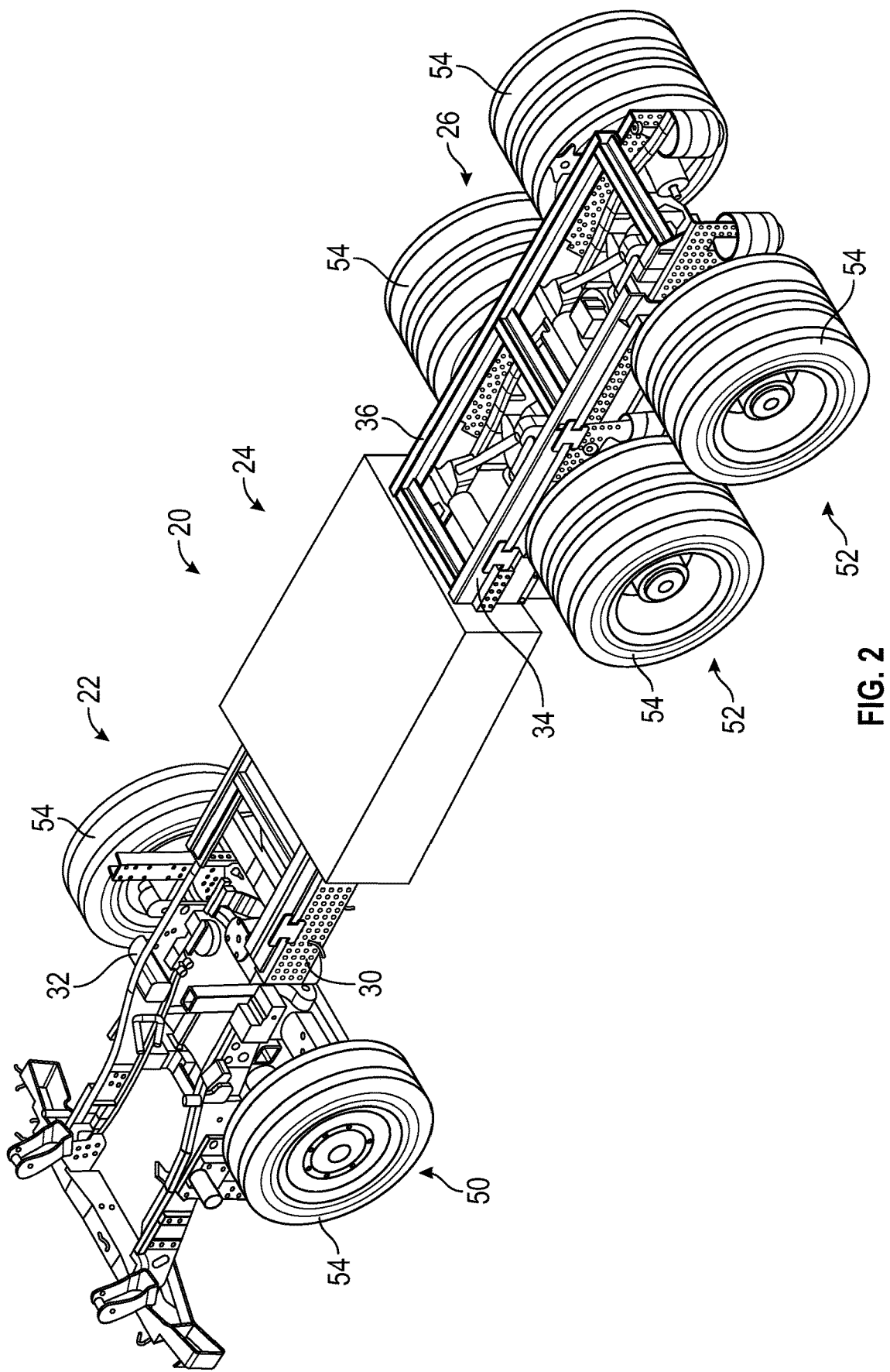
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles 52 may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide to the front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle 10 is longitudinal, with the front side 86 being arranged forward of the rear side 88.

Front-Loading Refuse Vehicle

Figure 3:
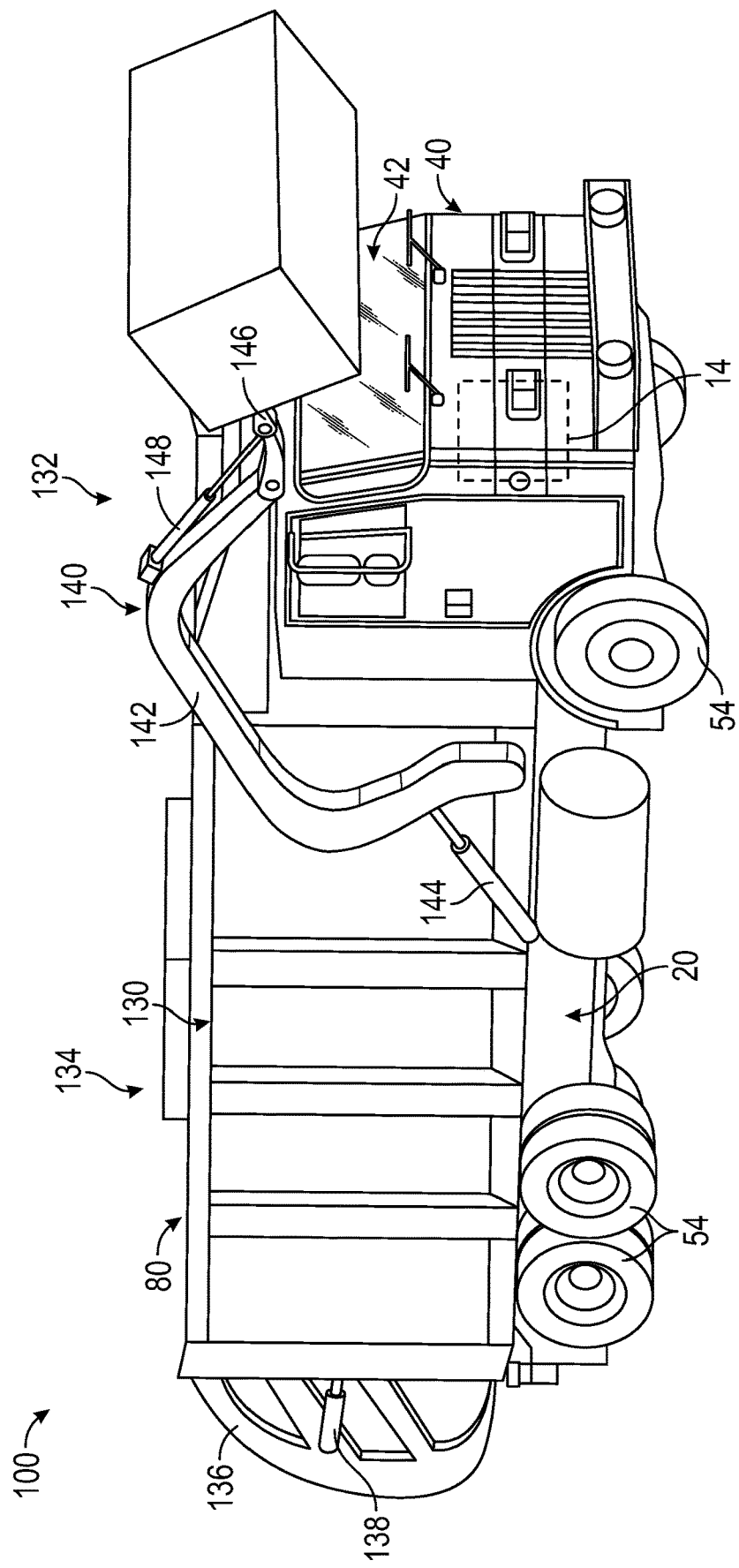
FIG. 3 is a perspective view of the vehicle of FIG. 1 configured as a front-loading refuse vehicle, according to an exemplary embodiment.
Figure 4:
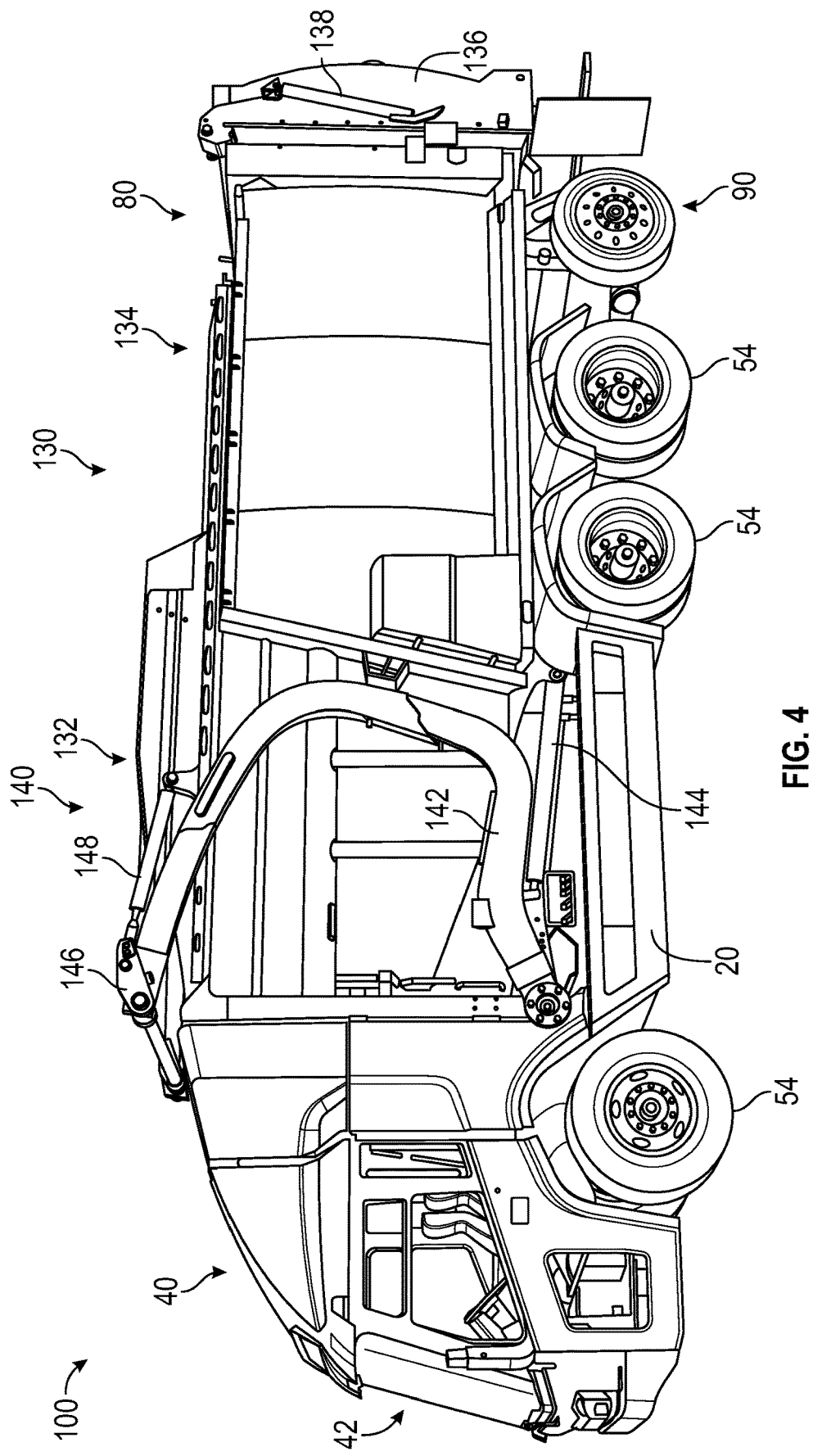
FIG. 4 is a left side view of the front-loading refuse vehicle of FIG. 3 configured with a tag axle.
Figure 5:
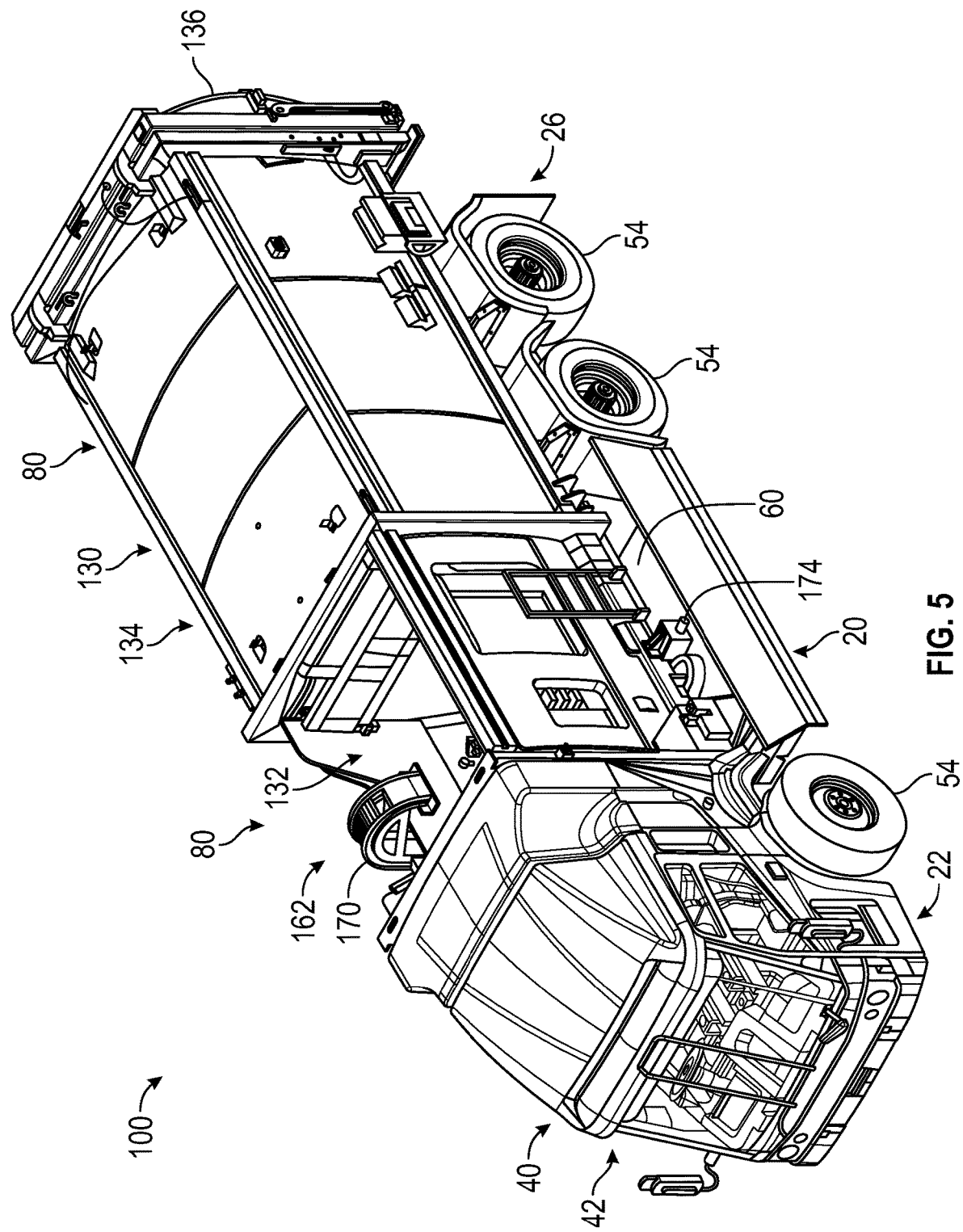
FIG. 5 is a perspective view of the vehicle of FIG. 1 configured as a side-loading refuse vehicle, according to an exemplary embodiment.
Figure 6:
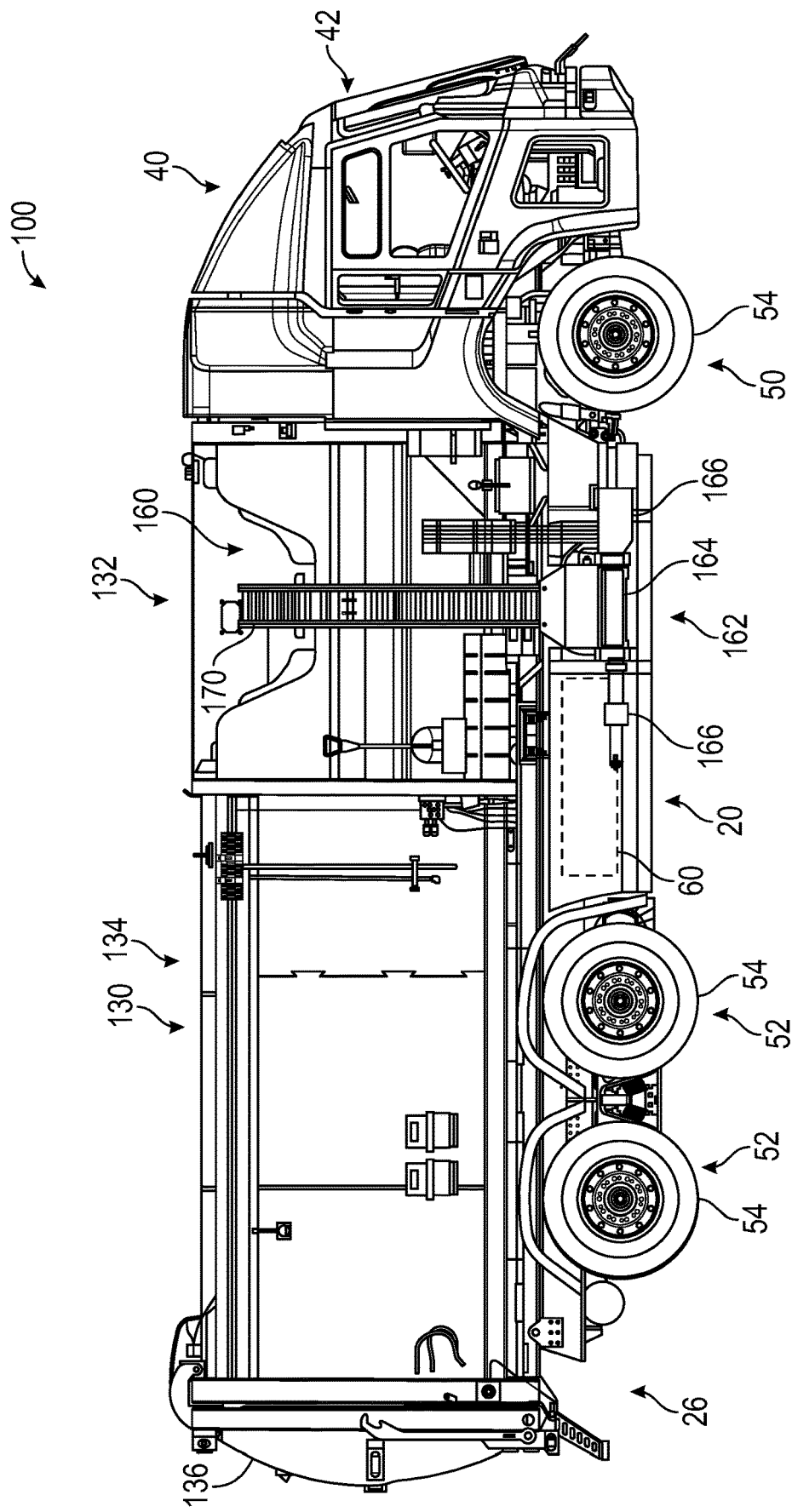
FIG. 6 is a right side view of the side-loading refuse vehicle of FIG. 6=5.
Figure 7:
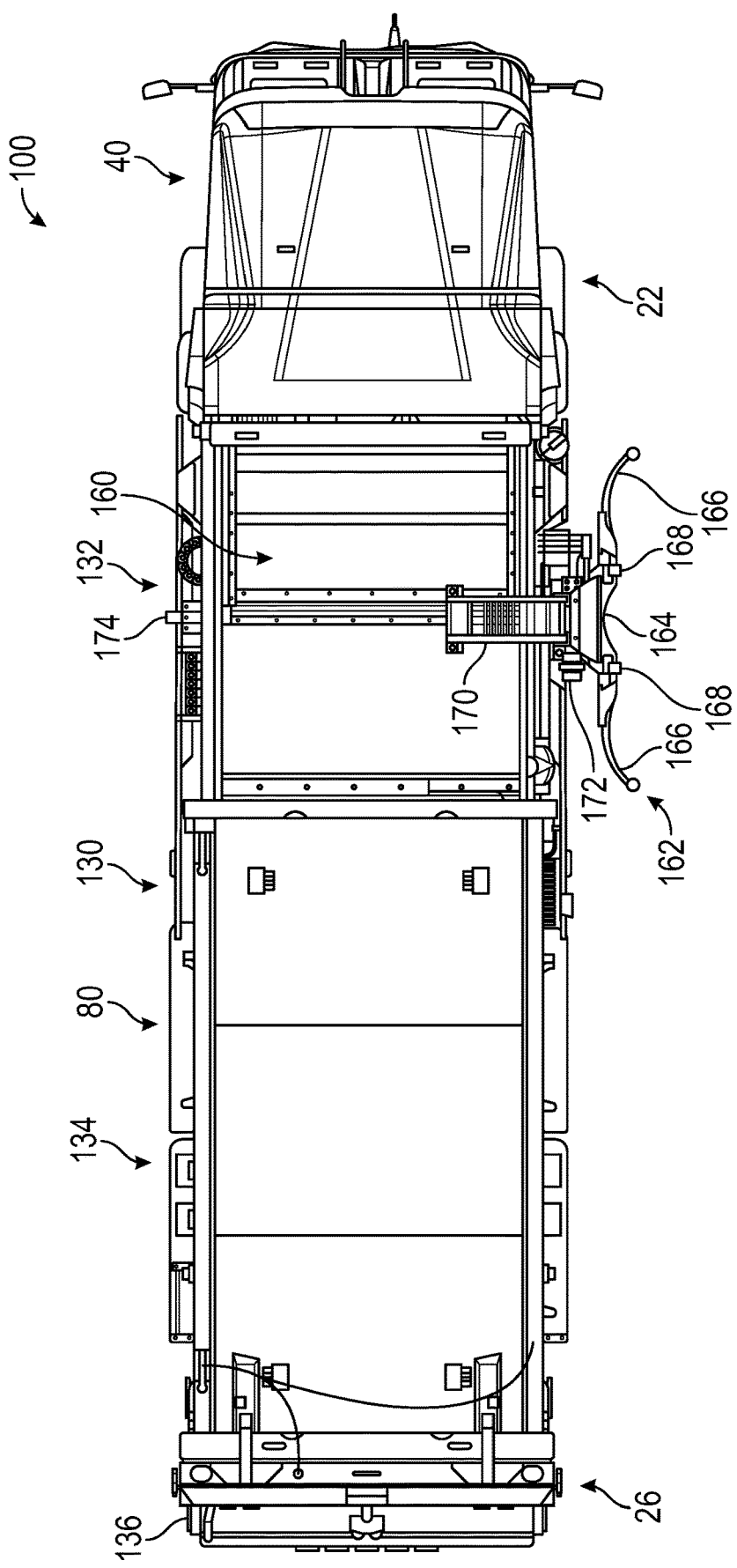
FIG. 7 is a top view of the side-loading refuse vehicle of FIG. 5.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively couple the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

Side-Loading Refuse Vehicle

Figure 8:
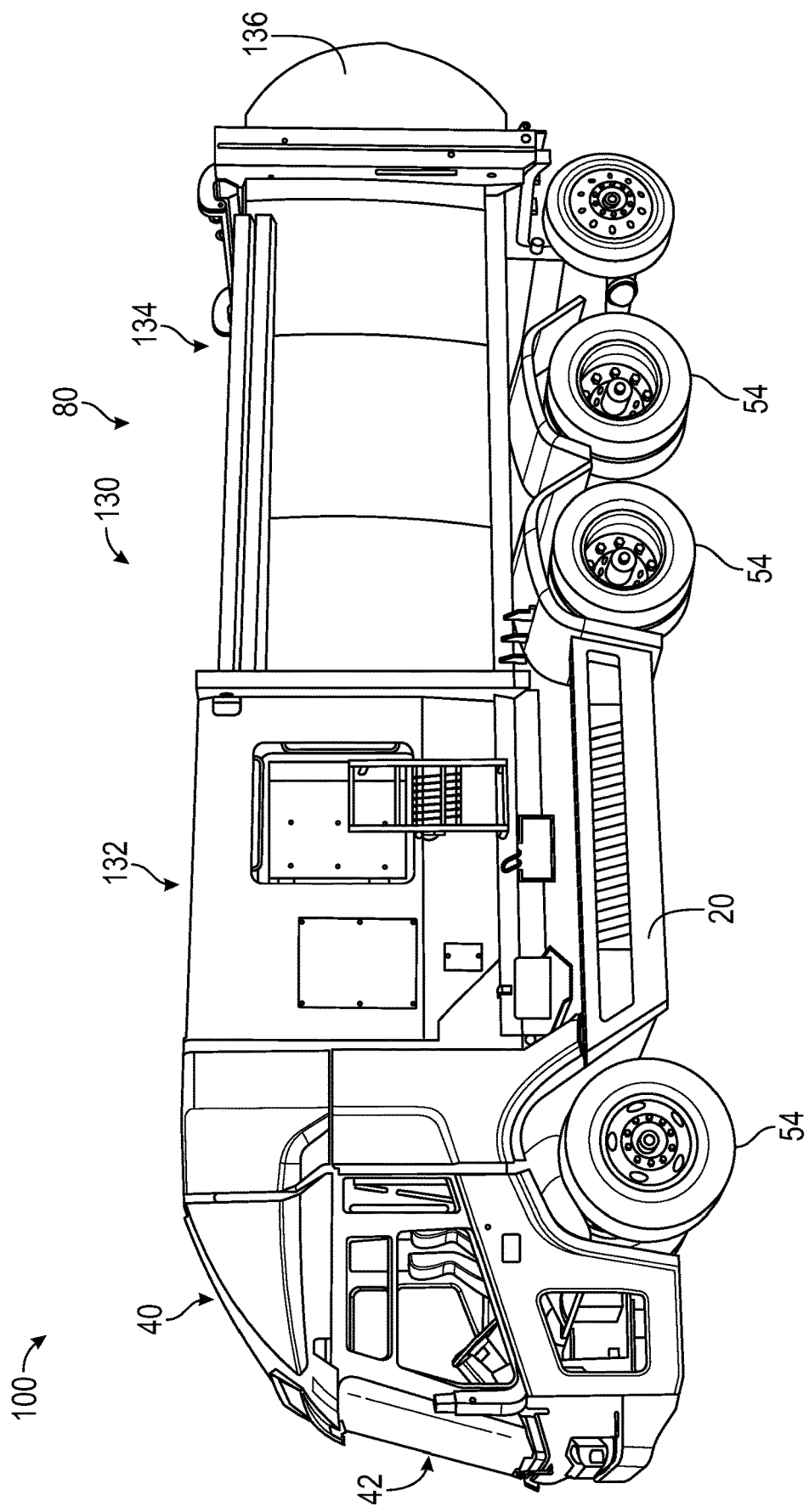
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown in FIG. 8, the refuse vehicle 100 of FIGS. 5-7 may be configured with a tag axle 90.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

Concrete Mixer Truck

Figure 9:
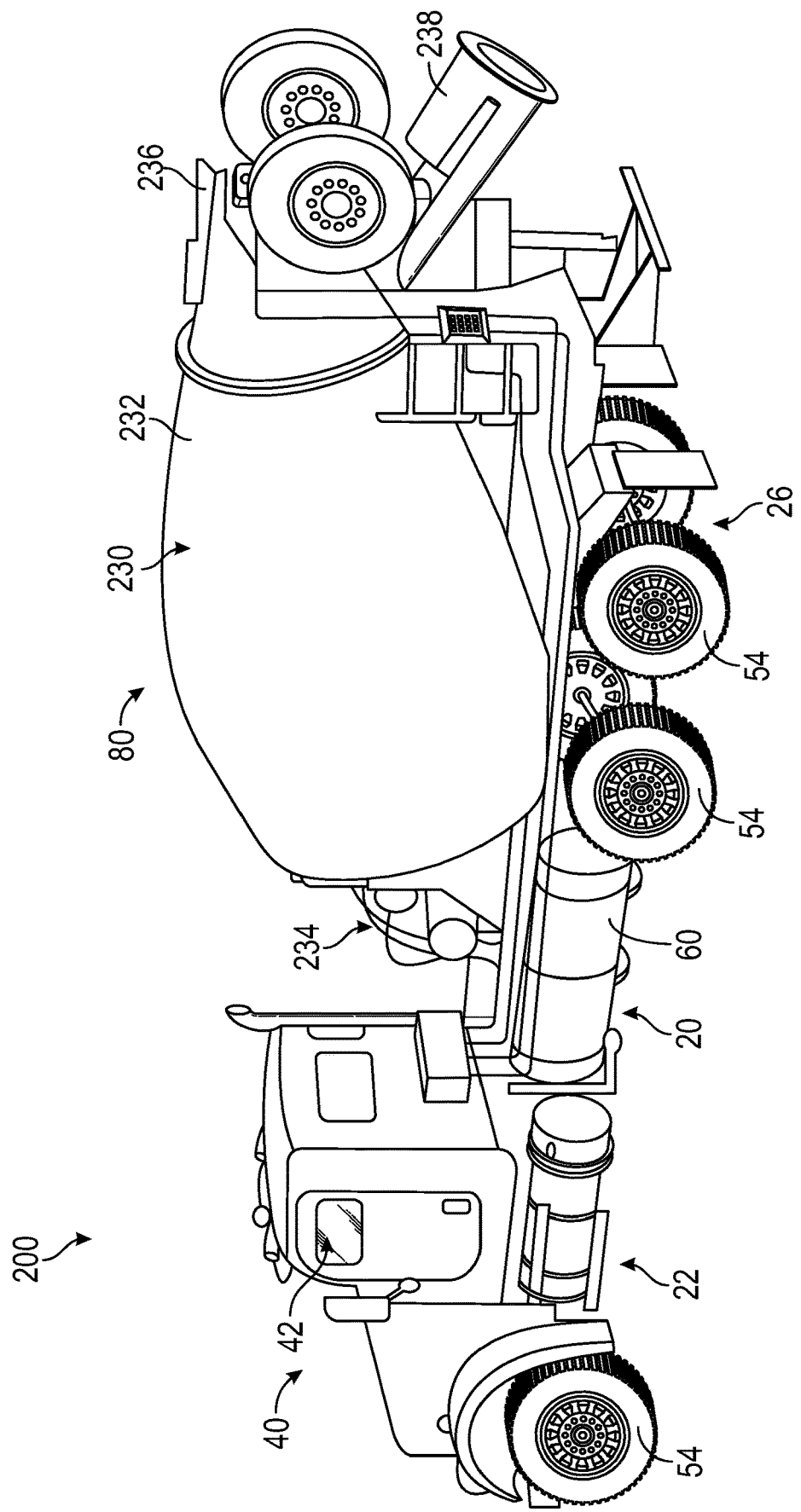
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plane extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

Fire Truck

Figure 10:
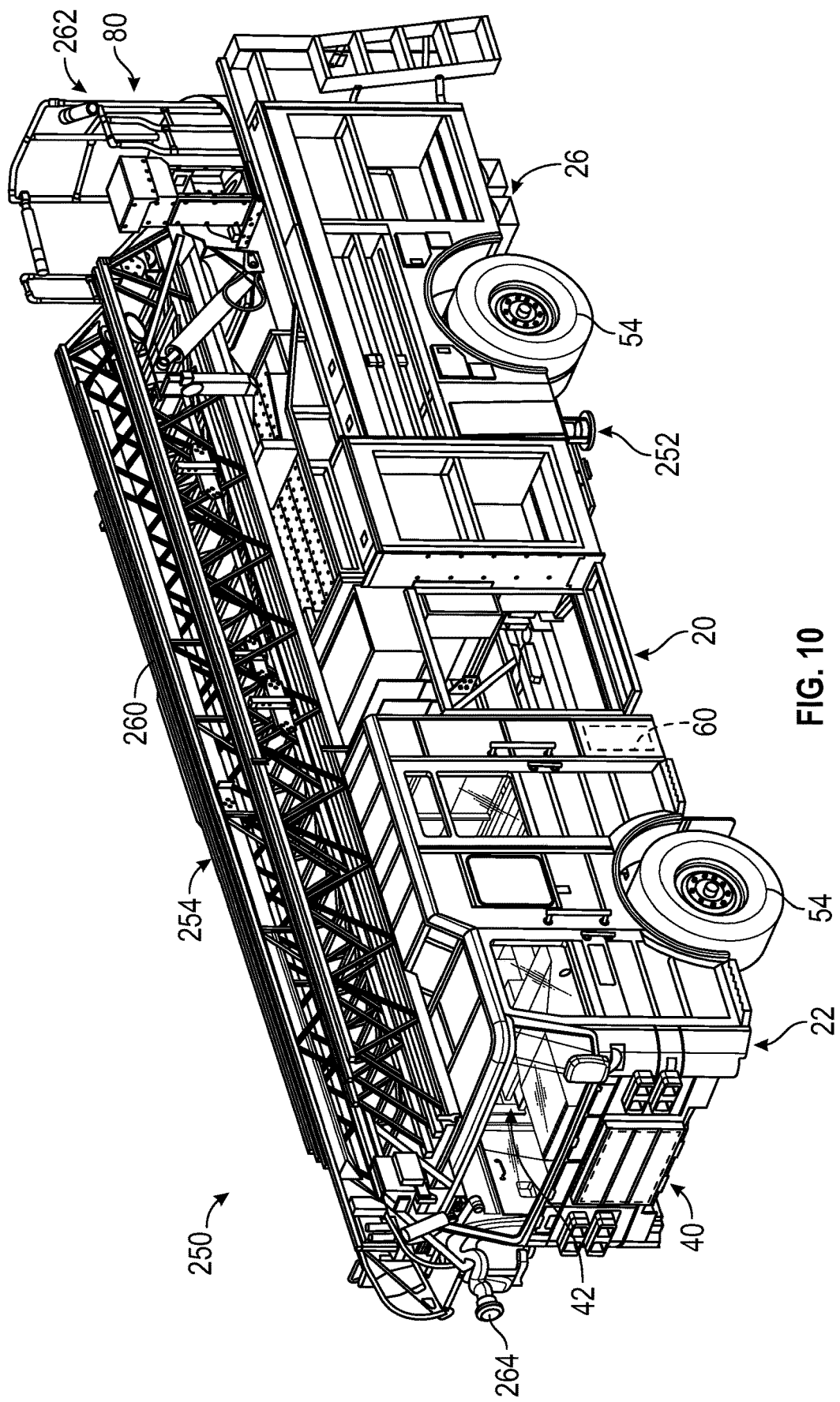
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

ARFF Truck

Figure 11:
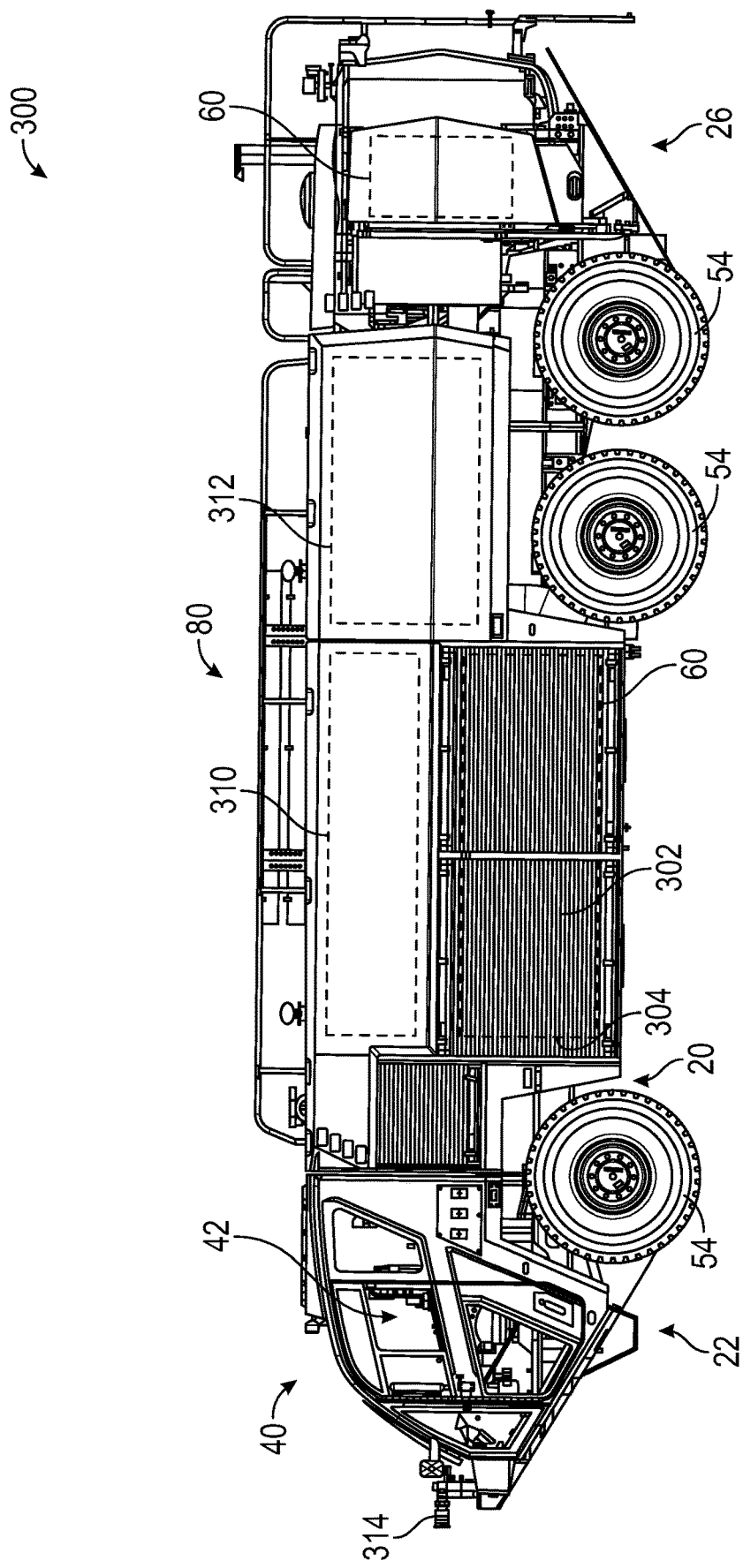
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

Boom Lift

Figure 12:
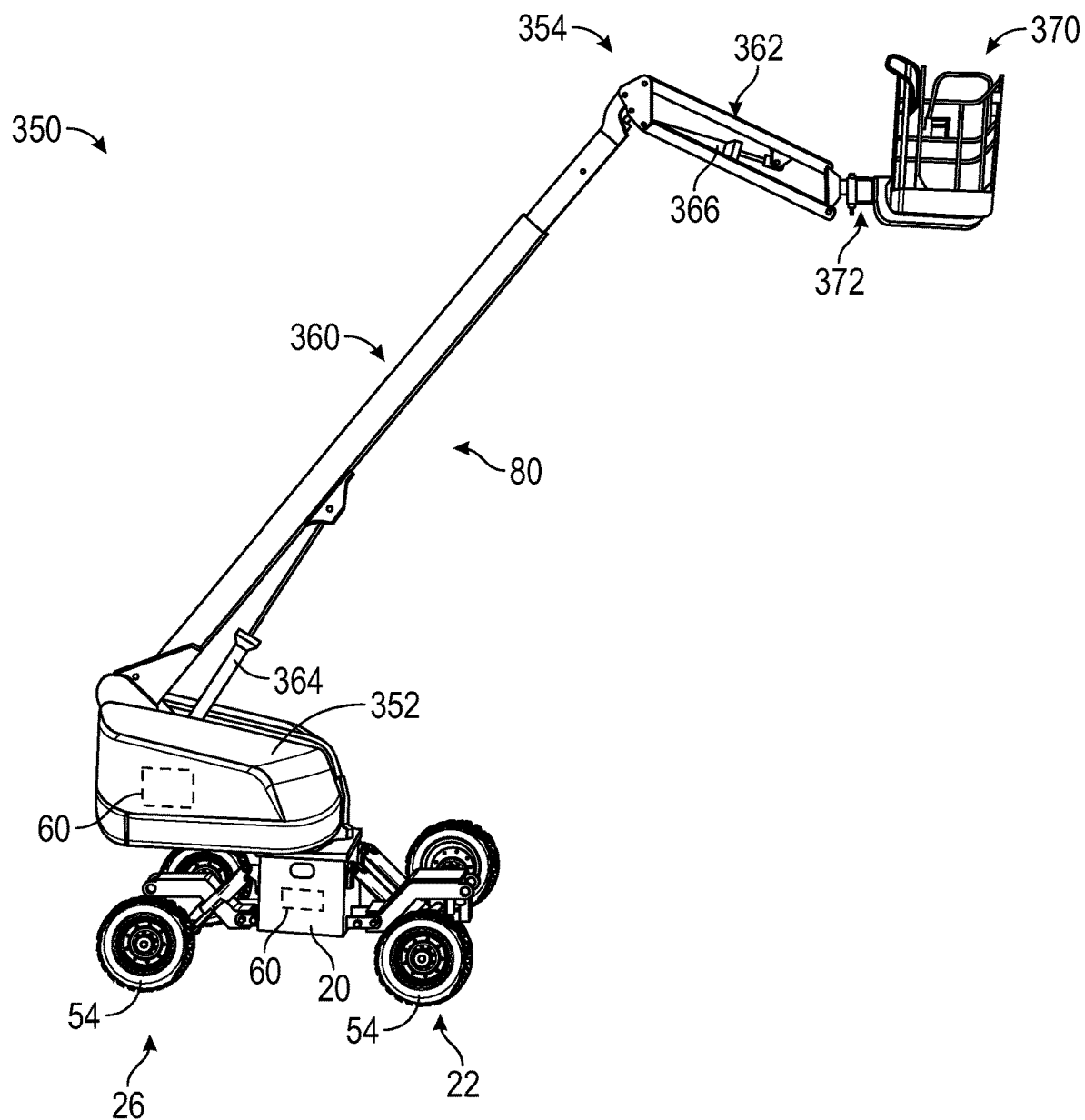
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may include structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

Scissor Lift

Figure 13:
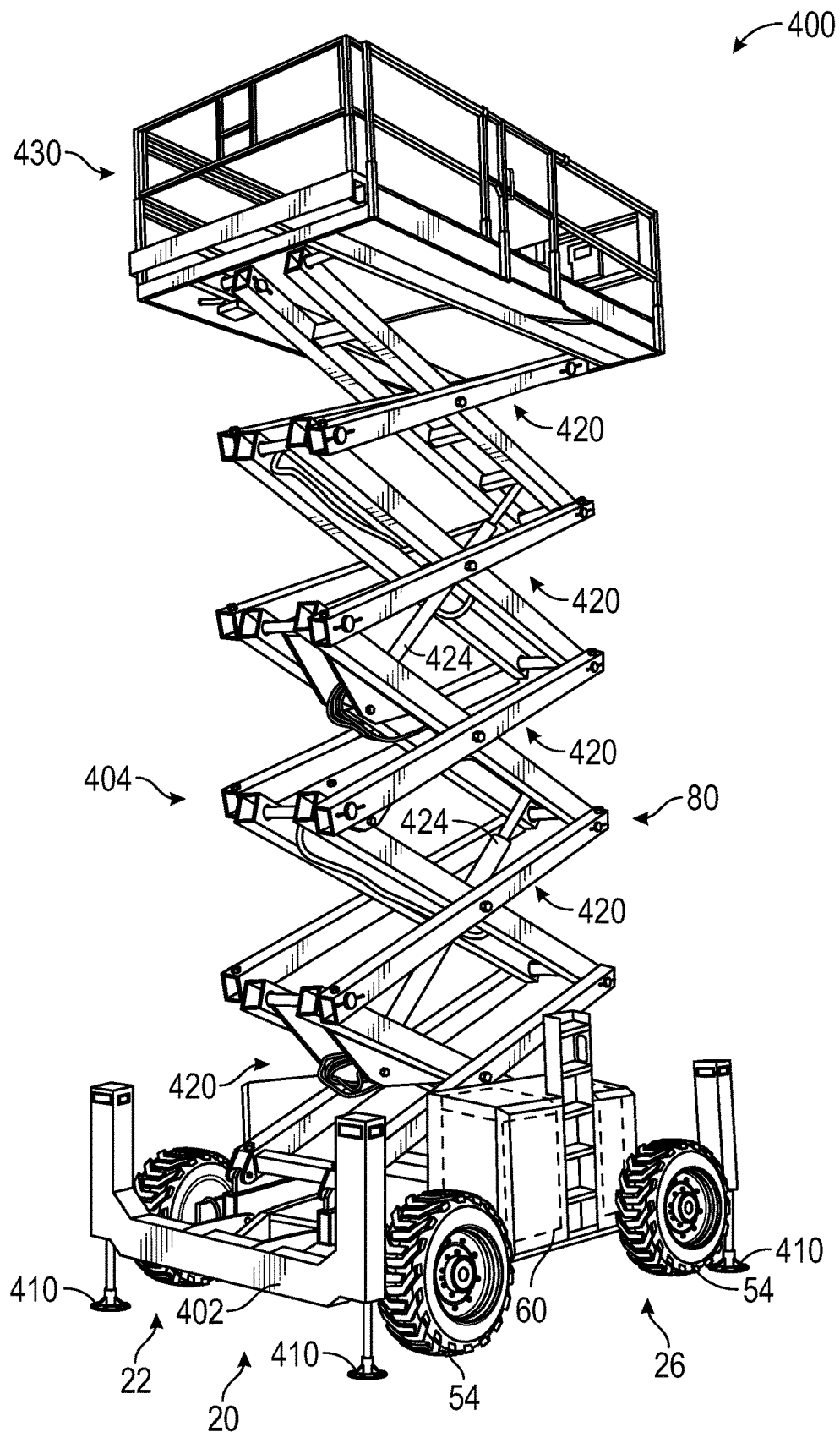
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

One Pedal Brake System

Figure 14:
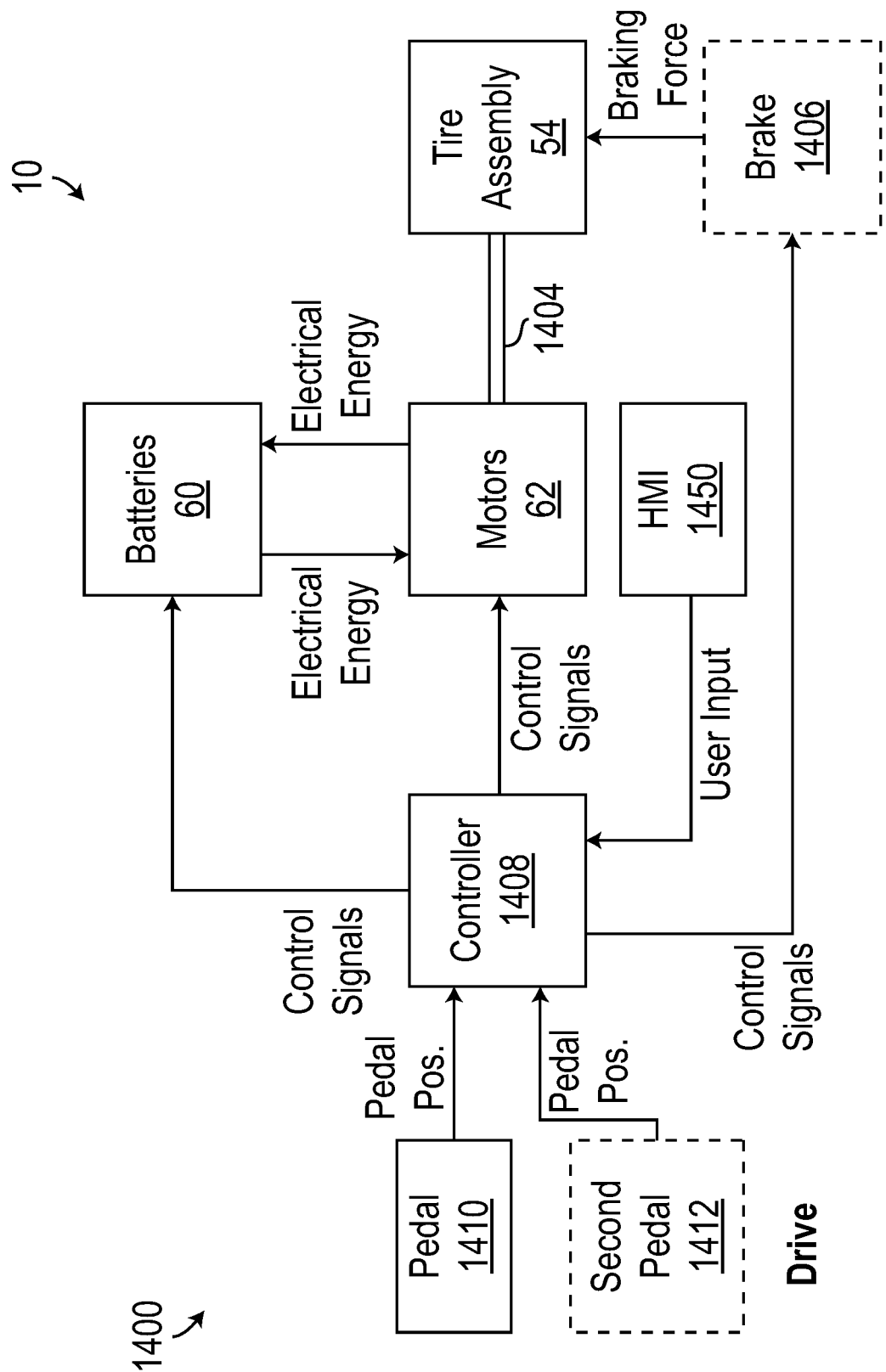
FIG. 14 is a block diagram of a pedal system for the vehicle of FIG. 1, the front-loading vehicle of FIG. 3, the side-loading vehicle of FIG. 6, the mixer vehicle of FIG. 9, the fire fighting vehicle of FIG. 10, the airport fire fighting vehicle of FIG. 11, the boom lift of FIG. 12, or the scissor lift of FIG. 13, according to some embodiments.

Referring to FIG. 14, a pedal system 1400 for the vehicle 10 includes a pedal 1410 (e.g., an accelerator pedal, a brake pedal, etc.), a controller 1408, the drive motors 62, the batteries 60, a brake 1406, and a tire assembly 54. In some embodiments, the pedal system 1400 is configured to use a single pedal (e.g., the pedal 1410), and, based on operation of the pedal 1410, determine an amount of braking (e.g., regenerative braking, friction braking, or a combination thereof), and an amount of acceleration for the vehicle 10 (e.g., operation of the drive motors 62). In some embodiments, the pedal system 1400 can be completely operated through operation of the pedal 1410. In some embodiments, the pedal system 1400 facilitates improved control of the vehicle 10 (e.g., acceleration and braking functions of the vehicle 10) with a simplified human machine interface.

In some embodiments, the drive motors 62 are motors of an electrified axle ("E-axle") of the vehicle 10 that are configured to provide torque for the tire assemblies 54. In some embodiments, the vehicle 10 includes multiple of the drive motors 62, each of the drive motors 62 associated with a corresponding one of the tire assemblies 54, and configured to provide torque to the corresponding tire assembly 54 to transport the vehicle 10. In some embodiments, the drive motors 62 are a single electric motor that is configured to provide torque to the tire assemblies 54 through a transmission, a differential, axles, etc. (e.g., a drive train or a driveline).

The drive motors 62 may operate in a drive mode (e.g., a first mode) to consume electrical energy from the batteries 60 and use the electrical energy to generate mechanical energy for the tire assemblies 54. In some embodiments, the drive motors 62 are configured to drive the tire assemblies 54 through a driveshaft 1404. In some embodiments, the drive motors 62 are configured to operate in a regenerative braking mode (e.g., a second mode) as a generator and use torque provided by the tire assembly 54 to be back-driven through the driveshaft 1404 to provide generative braking to the tire assemblies 54. In some embodiments, the drive motors 62 are configured to generate electrical energy due to being back-driven by the tire assemblies 54 (e.g., due to inertia of the vehicle 10) and provide the electrical energy to the batteries 60 for charging the batteries 60.

In some embodiments, the brake 1406 is configured to provide braking force for the tire assembly 54 using a friction brake (e.g., pads and a rotor). In some embodiments, the brake 1406 is optional. The brake 1406 may be operated through operation of the pedal 1410, or by operation of another pedal, shown as second pedal 1412. In some embodiments, the second pedal 1412 is also configured to provide a pedal position input to the controller 1408 which can be used to operate the brake 1406.

In some embodiments, the pedal 1410 provides an input of a pedal position to the controller 1408. In some embodiments, the controller 1408 uses the pedal position of the pedal 1410 to determine control signals for any of the drive motors 62, the batteries 60, or the brake 1406. In some embodiments, the controller 1408 is configured to operate the batteries 60, the drive motors 62, and/or the brakes 1406 to either provide braking (e.g., regenerative braking) or to accelerate the vehicle 10.

Figure 15:
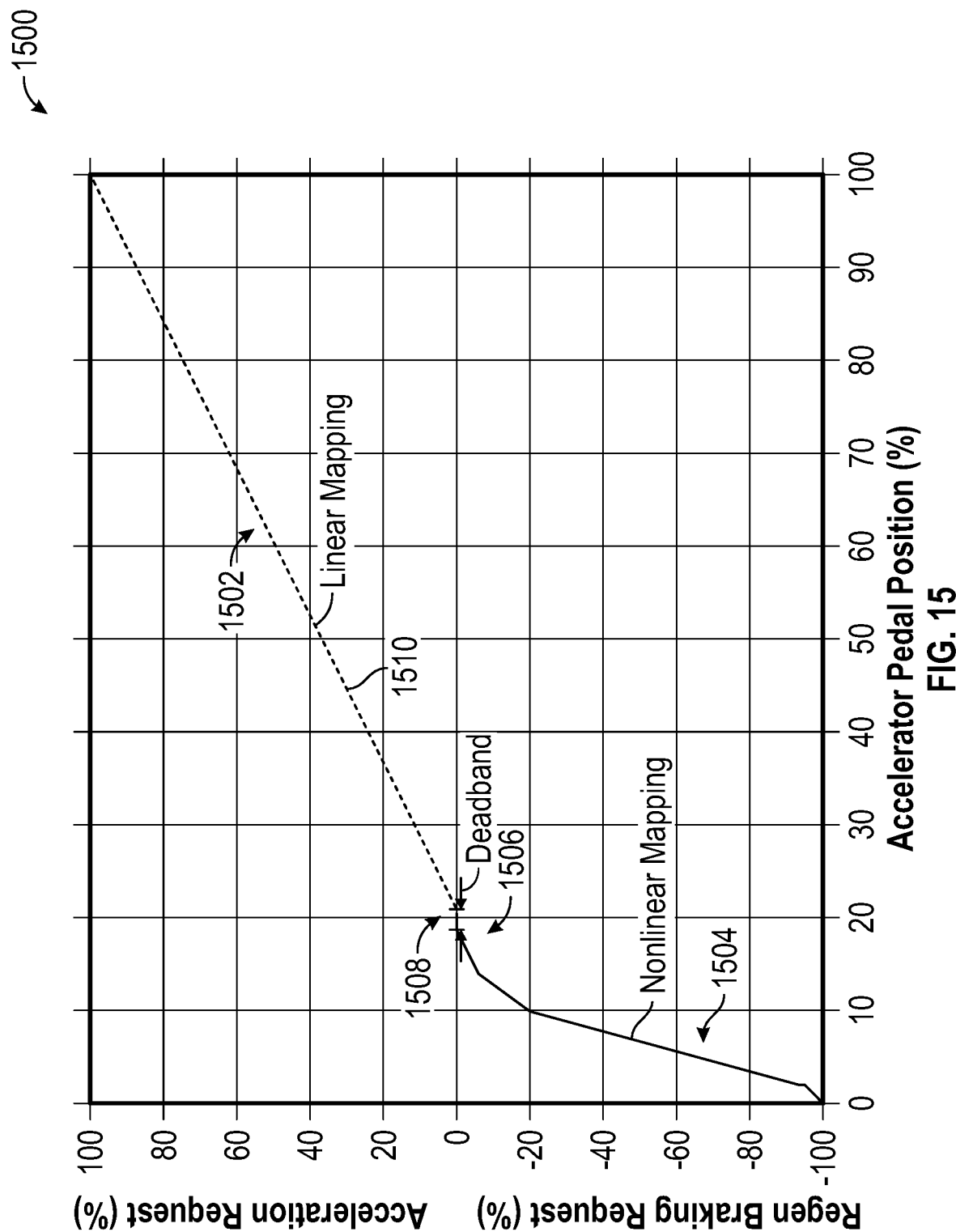
FIG. 15 is a graph illustrating a linear portion used for determining an amount of acceleration and a non-linear portion for determining an amount of regenerative braking based on pedal position, according to some embodiments.

Referring to FIG. 15, the controller 1408 can be configured to operate the drive motors 62 and the batteries 60 to provide acceleration and/or regenerative braking for the vehicle 10, illustrated by graph 1500. The graph 1500 includes a series 1510 that illustrates a relationship between the pedal position (shown on the X-axis) and an amount of acceleration or an amount of regenerative braking (shown on the Y-axis). The X-axis specifically illustrates the pedal position of the pedal 1410 (e.g., a percentage of a total amount of depression of the pedal 1410). The Y-axis illustrates the amount of acceleration requested (e.g., in a percentage of a total capable acceleration of the vehicle 10) and the amount of regenerative braking requested (e.g., in a percentage of a total capable regenerative braking available for the vehicle 10).

The series 1502 includes a linear portion 1502, and a non-linear portion 1504, according to some embodiments. The linear portion 1502 illustrates the relationship between the accelerator pedal position (the X-axis) and the acceleration request (the Y-axis). The non-linear portion 1504 illustrates the relationship between the accelerator pedal position and the regenerative braking request. In some embodiments, the series 1510 includes a deadband 1506 where the linear portion 1502 and the non-linear portion 1504 meet. In some embodiments, the deadband 1506 is at 20% depression of the pedal 1410 (the X-axis), and 0% acceleration request or regenerative braking request (the Y-axis). In this way, when the pedal 1410 is depressed beyond approximately 20%, depression, the controller 1408 operates the drive motors 62 to transport the vehicle 10. If the pedal 1410 is released so that the depression of the pedal 1410 is less than 20% depression, the controller 1408 may operate the drive motors 62 to function as generators and provide regenerative braking according to the amount of regenerative braking request (the X-axis below 0) determined by the controller 1408 using the non-linear portion 1504 of the series 1510. In this way, the pedal 1410 can be operated above 20% depression to function as an accelerator pedal, with increased depression resulting in increased acceleration of the vehicle 10, and operated below 20% depression to function as a brake pedal, with decreased depression resulting in increased regenerative braking of the vehicle 10. The non-linear portion 1504 of the series 1510 can generally have an S-shape or a sigmoid function.

The deadband portion 1506 is at the 20% accelerator pedal position (along the X-axis) so that, at approximately 20% accelerator pedal position, minimal further depression or minimal release of the pedal 1410 (e.g., +/−1%) results in neither acceleration request nor regenerative braking request. The deadband portion 1506 is applied at the transition between the linear portion 1502 and the non-linear portion 1504 to reduce a potential for oscillatory acceleration or deceleration feel by setting a zero acceleration or regenerative braking request in the range of 19% to 21%. In this way, regenerative braking from 0 to 100% is mapped to accelerator pedal position of 20% (or more specifically, 19% if accounting for the deadband) to 0% respectively. Similarly, acceleration request from 0 to 100% is mapped to accelerator pedal position of 20% (or more specifically, 21% if accounting for the deadband) to 100%. The controller 1408 may be configured to adjust or tune the mapping for both acceleration (e.g., the linear portion 1502) and the regenerative braking (e.g., the non-linear portion 1504) using a lookup table to thereby adjust sensitivity of the pedal 1410 at the deadband portion 1506 (e.g., adjusting a total amount of the deadband 1506). In some embodiments, the regenerative braking (e.g., the non-linear portion 1504) is zeroed at low speeds (e.g., below 1 mph) of the vehicle 10 to limit requesting negative torque at the tire assemblies 54 and to prevent or limit unintentional reverse motion of the vehicle 10. In this way, the series 1510 or the relationship illustrated by the series 1510 that is used by the controller 1408 can be adjusted based on the current speed of the vehicle 10.

In some embodiments, the transition between the linear portion 1502 (e.g., acceleration mapping) and the non-linear portion 1504 (e.g., regenerative braking request mapping) is selected at 20% in order to bias the operation of the vehicle 10 towards normal acceleration thereby allowing precise acceleration control of the vehicle 10.

Figure 16:
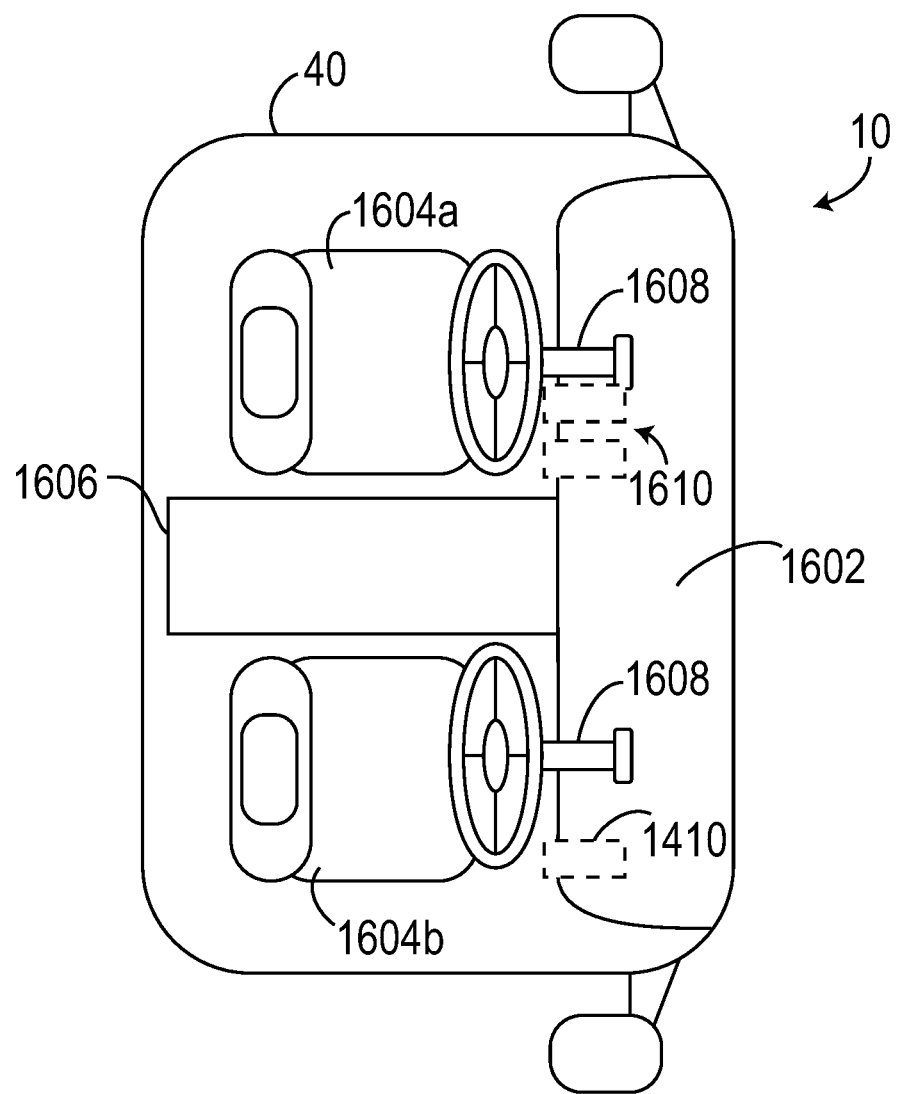
FIG. 16 is view of a cab of a vehicle including a pedal of the pedal system of FIG. 14, according to some embodiments.

Referring to FIG. 16, the interior of the cab 40 is shown, according to some embodiments. The cab 40 includes seats 1604 (e.g., a driver's side or fits seat 1604a and a curbside or second seat 1604b). In some embodiments, the arrangement of the cab 40 and the seats 1604 is a dual-drive configuration. The cab 40 also includes a dashboard 1602, a console 1606, and a pair of steering wheels 1608. The cab 40 also includes a pair of pedals 1610 that are configured to provide acceleration and braking for the vehicle 10. For example, a first one of the pedals 1610 may be an accelerator pedal, with increased depression being used by the controller 1408 to cause the drive motors 62 to increase an acceleration of the vehicle 10. Likewise, a second one of the pedals 1610 may be a brake pedal, with increased depression of the brake pedal being used by the controller 1408 to cause increased braking of the vehicle 10 (e.g., by operating the brakes 1406 or by operating the drive motors 62 to provide regenerative braking).

Referring still to FIG. 16, the cab 40 also includes the pedal 1410 positioned by the curbside seat 1604b. The pedal 1410 is positioned at the curbside seat 1604b so that an operator of the vehicle 10 can operate the vehicle 10 using the pedal 1410 while performing a curbside collection process. For example, when the vehicle 10 is being transported along a curb or side of a road and frequently stopped so that the vehicle 10 can load refuse into a hopper or body of the vehicle 10 (e.g., the application kit 80), the operator may switch to the curbside seat 1604b and operate the vehicle 10 using the pedal 1410. The operator can let off the pedal 1410 so that the vehicle 10 uses regenerative braking to stop at the refuse bins along the curb or the side of the road. In this way, the operator can switch between the driver's side seat 1604a and the curbside seat 1604b for highway or collection.

Figure 17:
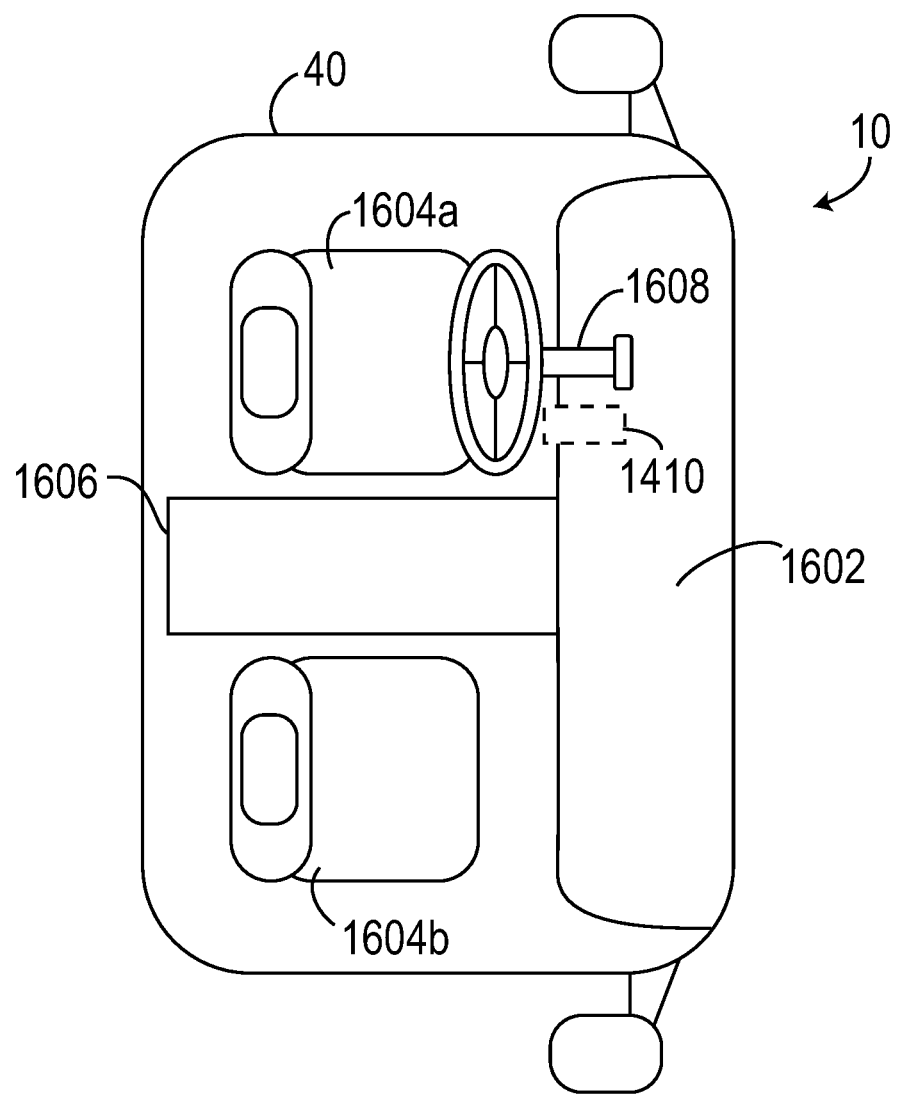
FIG. 17 is a view of a cab of a vehicle including a pedal of the pedal system of FIG. 14, according to some embodiments.

Referring to FIG. 17, the cab 40 is shown according to another embodiment. The cab 40 includes the seats 1604, and includes the pedal 1410 at the driver's side seat 1604a, according to some embodiments. In some embodiments, the cab 40 only includes a single steering wheel 1608 such that the vehicle 10 is solely operated for transportation on the driver's side using the pedal 1410 (e.g., for both acceleration and braking). In some embodiments, the cab 40 includes an additional brake pedal that operates the brake 1406 (e.g., friction brakes).

Figure 18:
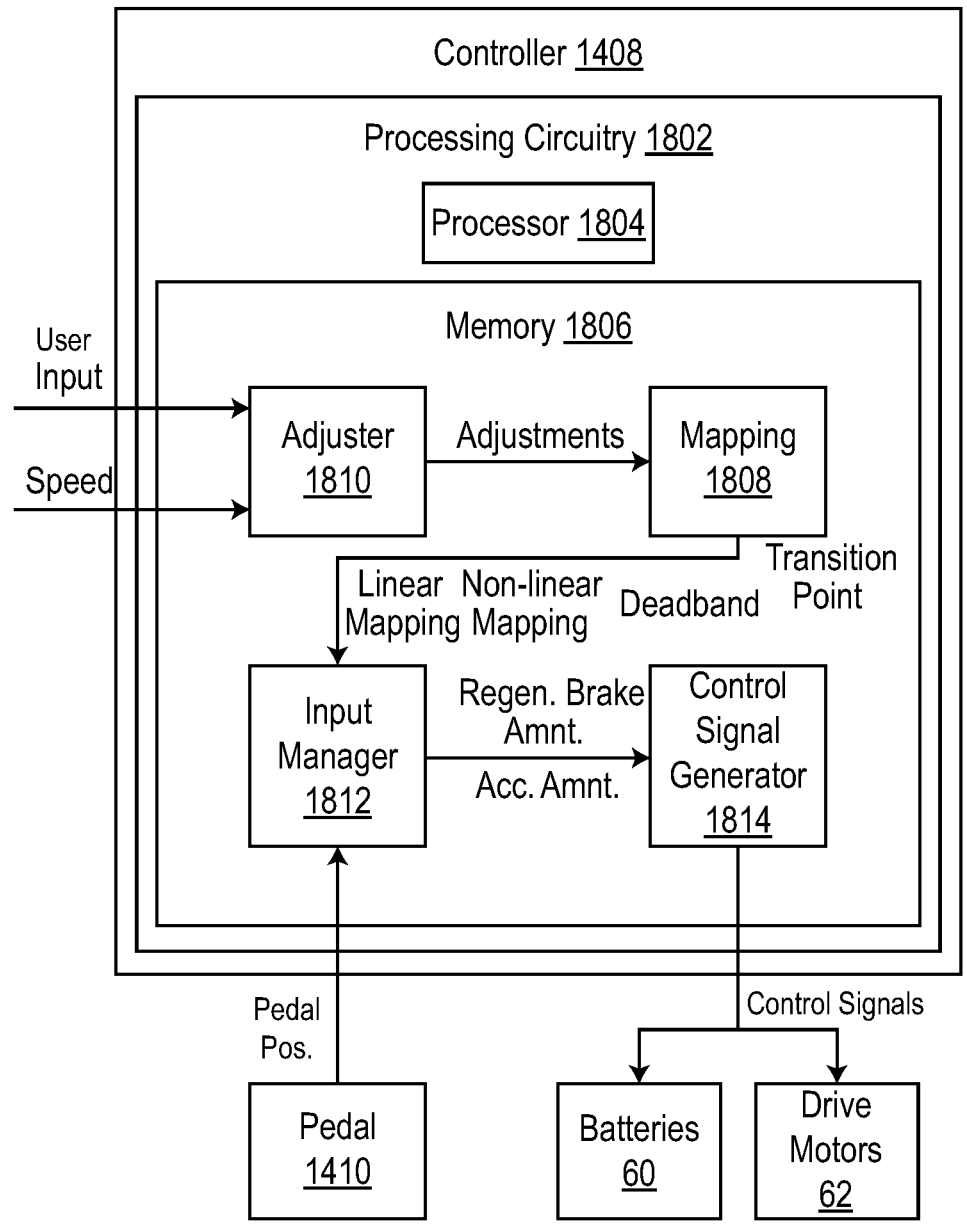
FIG. 18 is a block diagram of a controller of the pedal system of FIG. 14, according to some embodiments.

Referring particularly to FIG. 18, the pedal system 1400 is shown in greater detail, according to some embodiments. The controller 1408 is configured to receive the pedal position from the pedal 1410 and determine control signals for the batteries 60 and/or the drive motors 62 based on the pedal position provided by the pedal 1410.

The controller 1408 includes processing circuitry 1802, a processor 1804, and memory 1806. Processing circuitry 1802 can be communicably connected to the communications interface such that processing circuitry 1802 and the various components thereof can send and receive data via the communications interface. Processor 1804 can be implemented as a general purpose processor, an application specific integrated circuit (ASIC), one or more field programmable gate arrays (FPGAs), a group of processing components, or other suitable electronic processing components.

Memory 1806 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 1806 can be or include volatile memory or non-volatile memory. Memory 1806 can include database components, object code components, script components, or any other type of information structure for supporting the various activities and information structures described in the present application. According to some embodiments, memory 1806 is communicably connected to processor 1804 via processing circuitry 1802 and includes computer code for executing (e.g., by processing circuitry 1802 and/or processor 1804) one or more processes described herein.

In some embodiments, controller 1408 is implemented within a single computer (e.g., one server, one housing, etc.). In various other embodiments, the functionality of the controller 1408 can be distributed across multiple servers or computers (e.g., that can exist in distributed locations).

The controller 1408 includes an adjuster 1810, a mapping 1808 (e.g., the series 1510 or a mathematical representation of the series 1510), an input manager 1812, and a control signal generator 1814, according to some embodiments. In some embodiments, the input manager 1812 is configured to use the mapping 1808 and the pedal position provided by the pedal 1410 (e.g., a percentage of a total depression of the pedal 1410) to determine either an amount of regenerative braking or an amount of acceleration for the vehicle 10 that is indicated by the pedal position. In some embodiments, the input manager 1812 is configured to receive a linear mapping (e.g., a relationship used by the input manager 1812 for acceleration), a non-linear mapping (e.g., a relationship used by the input manager 1812 for regenerative braking), a deadband, and a transition point as the mapping 1808. In some embodiments, the mapping 1808 is or defines the relationship as shown in FIG. 15 between pedal position of the pedal 1410 and an amount of acceleration or an amount of regenerative braking responsive to the pedal position of the pedal 1410.

In some embodiments, the input manager 1812 is configured to use the pedal position $pos_{pedal}$ and the transition point, $pos_{trans}$ to determine if the linear mapping or the non-linear mapping should be used to determine either the amount of acceleration or the amount of regenerative braking. In some embodiments, the input manager 1812 compares the pedal position $pos_{pedal}$ to the transition point $pos_{trans}$, and if the pedal position $pos_{pedal}$ is greater than the transition point $pos_{trans}$ (e.g., $Pos_{pedal} > pos_{trans}$), uses the linear mapping to determine an amount of acceleration for the vehicle 10. In some embodiments, if the pedal position $pos_{pedal}$ is less than the transition point $pos_{trans}$, the input manager 1812 is configured to use the non-linear mapping to determine an amount of regenerative braking for the vehicle 10.

In some embodiments, the input manager 1812 uses the transition point $pos_{trans}$ and the deadband $pos_{DB}$ to determine if the linear mapping or the non-linear mapping should be used. In some embodiments, if the pedal position $pos_{pedal}$ is less than $pos_{trans}+pos_{DB}$ and greater than $pos_{trans}-pos_{DB}$, the input manager 1812 determines that no regenerative braking or acceleration should be used.

In some embodiments, if the pedal position $pos_{pedal}$ is greater than $pos_{trans}+pos_{DB}$, the input manager 1812 is configured to use the linear mapping to determine the amount of acceleration and provide the amount of acceleration to the control signal generator 1814. In some embodiments, if the pedal position $pos_{pedal}$ is less than $pos_{trans}-pos_{DB}$, the input manager 1812 is configured to use the non-linear mapping to determine the amount of regenerative braking and provide the amount of regenerative braking to the control signal generator 1814.

The linear mapping can be provided to the input manager 1812 as an equation or a function (e.g., y=mx+b), according to some embodiments. In some embodiments, the linear mapping has the form:

$$y-y_1=m(x-x_1)$$

and plugging in the transition point has the form:

$$y-0=m(pos-(pos_{trans}+pos_{DB}))$$

or:

$$acc_{request}=m(pos-(pos_{trans}+pos_{DB}))$$

$$m = \frac{acc_{max}}{pos_{max} - (pos_{trans} + pos_{DB})}$$

and $acc_{max}$ is the maximum acceleration amount that can be requested (e.g., 100%) and $pos_{max}$ is maximum depression of the pedal 1410 (e.g., 100%). In some embodiments, the input manager is configured to use the pedal position from the pedal 1410 and the linear mapping as shown above to determine the amount of acceleration that is requested (e.g., $acc_{request}$) and provide the amount of acceleration that is requested to the control signal generator 1814 which generates control signals for the batteries 60 and/or the drive motors 62 to implement the amount of acceleration that is requested.

In some embodiments, the non-linear mapping is provided to the input manager 1812 as a sigmoid function, a table, a curve, etc. In some embodiments, the input manager 1812 is configured to use the non-linear mapping and the pedal position to determine the amount of regenerative braking that is requested in response to the pedal position $pos_{pedal}$ being less than $pos_{trans}-pos_{DB}$. In some embodiments, the input manager 1812 is configured to use the sigmoid function provided by the mapping 1808, use the table and one or more interpolation or extrapolation techniques, use the curve, etc., to determine the amount of regenerative braking that is requested based for the pedal position $pos_{pedal}$. The input manager 1812 provides the amount of regenerative braking that is requested to the control signal generator 1814 which uses the amount of regenerative braking to generate control signals and provide the control signals to the batteries 60 and the drive motors 62 to implement the regenerative braking amount.

In some embodiments, the adjuster 1810 is configured to change any of the linear mapping, the non-linear mapping, the deadband amount, or the transition point of the mapping 1808 based on a user input that is provided via a human machine interface ("HMI") 1450. In some embodiments, the adjuster 1810 is configured to provide adjustments to the mapping 1808 in response to or based on a speed of the vehicle 10 (e.g., as provided by a speed sensor, a tachometer, feedback from the drive motors 62, etc.). For example, the adjuster 1810 may change the non-linear mapping to be substantially equal to zero or modify operation of the input manager 1812 so that the regenerative braking amount provided to the control signal generator 1814 is substantially equal to zero when the speed of the vehicle 10 approaches 0 mph (e.g., is less than 1 mph) to reduce a likelihood of a negative torque being applied to the tire assemblies 54 when the vehicle 10 comes to a stop.

Figure 19:
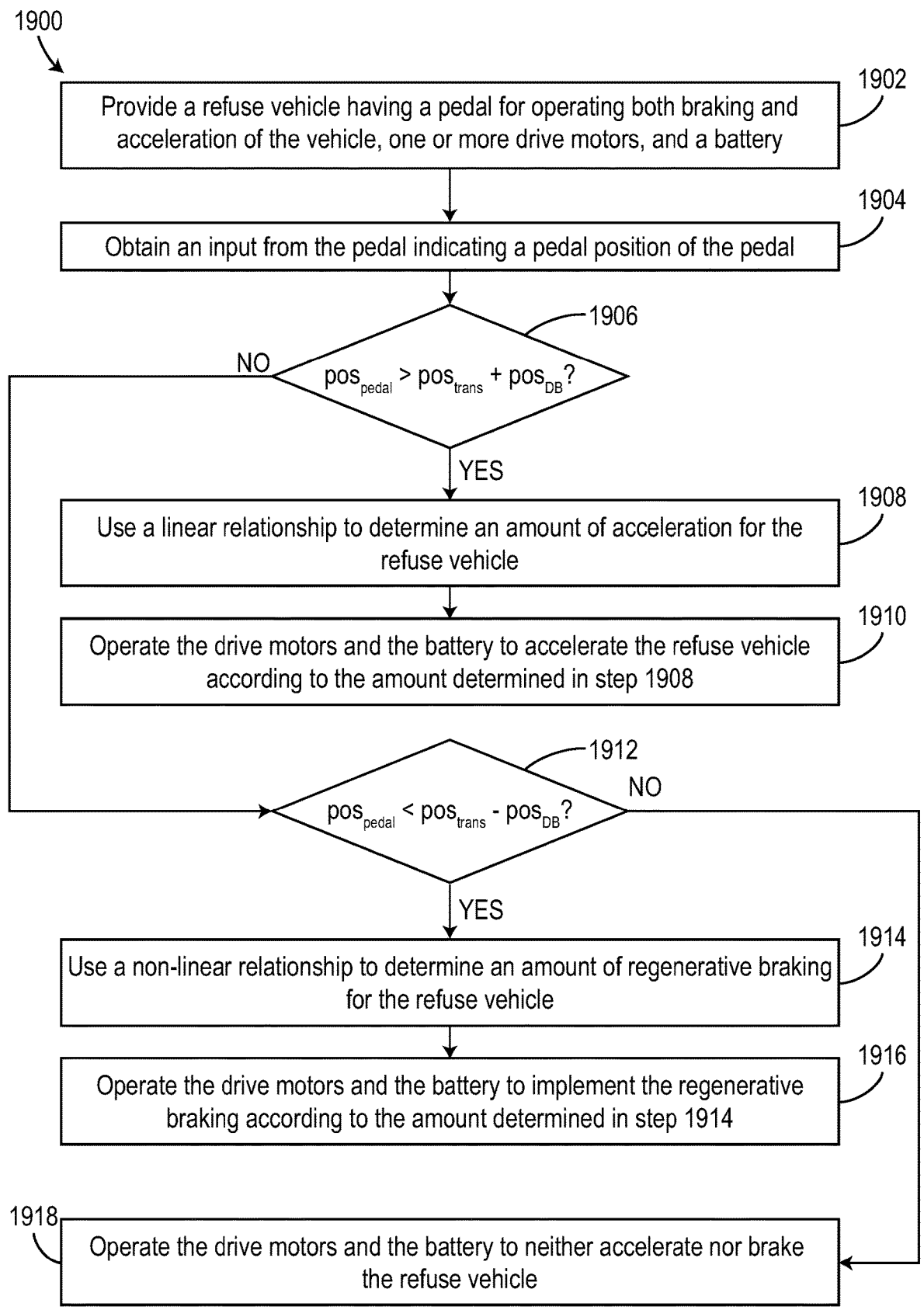
FIG. 19 is a flow diagram of a process for operating a vehicle to accelerate or perform regenerative braking based on a position of a pedal, according to some embodiments.

Referring particularly to FIG. 19, a process 1900 for operating a refuse vehicle using only one pedal is shown, according to some embodiments. In some embodiments, the process 1900 is performed in order to perform a collection process (e.g., when collecting refuse along a route). In some embodiments, the process 1900 includes steps 1902-1918 and can be performed by the vehicle 10 or by the pedal system 1400. In some embodiments, the process 1900 or the functionality described herein with reference to FIGS. 14-19 can be performed for the vehicle 10, the refuse vehicle 100, the mixer truck 200, the fire fighting vehicle 250, the ARFF truck 300, the boom lift 350, or the scissor lift 400.

The process 1900 includes providing a refuse vehicle having a pedal for operating both braking and acceleration functions of the refuse vehicle, one or more drive motors, and a battery (step 1902), according to some embodiments. In some embodiments, the refuse vehicle is the vehicle 10 or the refuse vehicle 100. In some embodiments, the pedal is the pedal 1410 as described in greater detail above with reference to FIGS. 14-18. The refuse vehicle can have an E-axle arrangement, where one or more axles of the refuse vehicle are individually electrified.

The process 1900 includes obtaining an input from the pedal indicating a pedal position of the pedal (step 1904), according to some embodiments. In some embodiments, step 1904 is performed by a controller such as the controller 1408. In some embodiments, the pedal position is a percentage of a total depression of the pedal 1410. For example, if the pedal 1410 is depressed halfway, the input from the pedal 1410 may be 50% or 0.5.

The process 1900 includes determining if the pedal position (e.g., $pos_{pedal}$) exceeds a transition point (e.g., $Pos_{trans}$) by at least a deadband amount (e.g., $pos_{DB}$) (step 1906), according to some embodiments. In some embodiments, step 1906 is performed by the input manager 1812 using the pedal position provided by the pedal 1410 (or a sensor of the pedal 1410) and a transition point (e.g., $pos_{trans}$). In some embodiments, step 1906 is also performed using the deadband amount. If the pedal position exceeds the transition point by at least the deadband amount (or half the deadband) (step 1906, "YES"), this indicates that the linear relationship should be used to determine an acceleration amount (e.g., that the pedal 1410 exceeds the transition point) and process 1900 proceeds to step 1908. If the pedal position does not exceed the transition point by at least the deadband amount (or half the deadband) (step 1906, "NO"), process 1900 proceeds to step 1912.

Process 1900 includes using a linear relationship to determine an amount of acceleration for the refuse vehicle (step 1908), and operating the drive motors and the battery to accelerate the refuse vehicle according to the amount determined in step 1908 (step 1910), according to some embodiments. In some embodiments, step 1908 is performed by the input manager 1812. In some embodiments, step 1908 includes using the linear relationship and the pedal position to determine the amount of acceleration for the refuse vehicle. In some embodiments, step 1910 includes generating control signals for the batteries 60 and the drive motors 62 and providing the control signals to the batteries 60 and the drive motors 62.

Process 1900 includes determining if the pedal position (e.g., $pos_{pedal}$) is less than the transition point (e.g., $pos_{trans}$) by at least a deadband amount (e.g., $pos_{DB}$) (step 1912), according to some embodiments. In some embodiments, step 1912 is performed by the input manager 1812 using the pedal position provided by the pedal 1410 (or a sensor of the pedal 1410) and a transition point (e.g., $pos_{trans}$). In some embodiments, step 1912 is also performed using the deadband amount. If the pedal position is less than the transition point by at least the deadband amount (or half the deadband) (step 1912, "YES"), this indicates that the non-linear relationship should be used to determine a regenerative braking amount (e.g., that the pedal 1410 exceeds the transition point) and process 1900 proceeds to step 1914. If the pedal position is not less than the transition point by at least the deadband amount (or half the deadband) (step 1912, "NO"), process 1900 proceeds to step 1918.

Process 1900 includes using a non-linear relationship to determine an amount of regenerative braking for the refuse vehicle (step 1914) and operating the drive motors and the battery to implement the regenerative braking according to the amount determined in step 1914 (step 1916), according to some embodiments. In some embodiments, step 1914 includes using the non-linear relationship (e.g., a sigmoid function) and the pedal position to determine the amount of regenerative braking. In some embodiments, step 1916 is similar to the step 1910.

Process 1900 includes operating the drive motors and the battery to neither accelerate nor brake the refuse vehicle (step 1918), according to some embodiments. In some embodiments, step 1918 is performed in response to both step 1906, "NO" and step 1912, "NO". Specifically, step 1918 can be performed when the pedal position is within the transition point plus or minus the deadband or the deadband divided by two $$\left(\text{e.g.}, (pos_{trans} - pos_{DB}) < pos_{pedal} < (pos_{trans} + pos_{DB}) \text{ or } pos_{trans} - \frac{pos_{DB}}{2}\right) < pos_{pedal} < \left(pos_{trans} + \frac{pos_{DB}}{2}\right)\right).$$

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:
1. A refuse vehicle comprising:
a drive motor configured to operate according to (i) a drive mode wherein the drive motor consumes electrical energy to drive a tractive element to transport the refuse vehicle, or (ii) a regenerative braking mode wherein the drive motor is driven by the tractive element to generate electrical energy and provide regenerative braking;
a battery configured to provide the electrical energy to the drive motor for transportation and receive electrical energy from the drive motor and charge using the electrical energy during regenerative braking of the refuse vehicle;
a pedal configured to be depressed by an operator of the refuse vehicle, wherein depression of the pedal across a first range of positions causes the drive motor to operate according to the drive mode to drive the tractive element for transportation, and depression of the pedal across a second range of positions causes the drive motor to operate according to the regenerative braking mode to be driven by the tractive element for generation of electrical energy and regenerative braking; and
processing circuitry configured to:
compare an amount of depression of the pedal to a transition point;
in response to the amount of depression of the pedal exceeding the transition point by at least a deadband amount, use a linear relationship and the amount of depression of the pedal to determine a requested amount of acceleration and operate the drive motor according to the drive mode to provide the requested amount of acceleration for transportation.
2. The refuse vehicle of claim 1, further comprising:
processing circuitry configured to:
obtain an amount of depression from the pedal;
responsive to the amount of depression of the pedal indicating that the pedal is within the first range of positions, operate the drive motor according to the drive mode based on the amount of depression of the pedal; and
responsive to the amount of depression of the pedal indicating that the pedal is within the second range of positions, operate the drive motor according to the regenerative braking mode based on the amount of depression of the pedal.
3. The refuse vehicle of claim 1, wherein the processing circuitry is configured to:
in response to the amount of depression of the pedal being less than the transition point, use a non-linear relationship and the amount of depression of the pedal to determine a requested amount of regenerative braking and operate the drive motor to provide the requested amount of regenerative braking.
4. The refuse vehicle of claim 3, wherein the processing circuitry is configured to use the non-linear relationship and the amount of depression of the pedal to determine a requested amount of regenerative braking and operate the drive motor to provide the requested amount of regenerative braking in response to the amount of depression of the pedal being less than the transition point by at least a deadband amount.

5. The refuse vehicle of claim 3, wherein the non-linear relationship is a sigmoid function.

6. The refuse vehicle of claim 1, wherein the transition point is 20% of a total depression of the pedal.

7. The refuse vehicle of claim 1, further comprising:
a friction brake configured to apply a frictional braking force to the tractive element; and
a brake pedal, wherein depression of the brake pedal results in the friction brake applying the frictional braking force to the tractive element.

8. A system for a vehicle, the system comprising:
a drive motor configured to operate according to (i) a drive mode wherein the drive motor consumes electrical energy to drive a tractive element to transport the vehicle, or (ii) a regenerative braking mode wherein the drive motor is driven by the tractive element to generate electrical energy and provide regenerative braking;
a battery configured to provide the electrical energy to the drive motor for transportation and receive electrical energy from the drive motor and charge using the electrical energy during regenerative braking of the vehicle;
a pedal configured to be depressed by an operator of the vehicle, wherein depression of the pedal across a first range of positions causes the drive motor to operate according to the drive mode to drive the tractive element for transportation, and depression of the pedal across a second range of positions causes the drive motor to operate according to the regenerative braking mode to be driven by the tractive element for generation of electrical energy and regenerative braking; and
processing circuitry configured to:
compare an amount of depression of the pedal to a transition point;
in response to the amount of depression of the pedal being less than the transition point by at least a deadband amount, use a non-linear relationship and the amount of depression of the pedal to determine a requested amount of regenerative braking and operate the drive motor to provide the requested amount of regenerative braking.

9. The system of claim 8, further comprising:
processing circuitry configured to:
obtain an amount of depression from the pedal;
responsive to the amount of depression of the pedal indicating that the pedal is within the first range of positions, operate the drive motor according to the drive mode based on the amount of depression of the pedal; and
responsive to the amount of depression of the pedal indicating that the pedal is within the second range of positions, operate the drive motor according to the regenerative braking mode based on the amount of depression of the pedal.

10. The system of claim 8, wherein the processing circuitry is configured to:
compare the amount of depression to a transition point;
in response to the amount of depression of the pedal exceeding the transition point, use a linear relationship and the amount of depression of the pedal to determine a requested amount of acceleration and operate the drive motor according to the drive mode to provide the requested amount of acceleration for transportation.

11. The system of claim 10, wherein the processing circuitry is configured to use the linear relationship and the amount of depression of the pedal to determine the requested amount of acceleration and operate the drive motor to provide the requested amount of acceleration for transportation in response to the amount of depression of the pedal exceeding the transition point by at least a deadband amount.

12. The system of claim 10, wherein the transition point is 20% of a total depression of the pedal.

13. The system of claim 8, wherein the non-linear relationship is a sigmoid function.

14. The system of claim 8, further comprising:
a friction brake configured to apply a frictional braking force to the tractive element; and
a brake pedal, wherein depression of the brake pedal results in the friction brake applying the frictional braking force to the tractive element.

15. A method for controlling regenerative braking and acceleration of a vehicle, the method comprising:
obtaining a signal from a pedal indicating an amount of depression of the pedal;
comparing the amount of depression of the pedal to a transition point; and
responsive to the amount of depression being less than the transition point by at least a deadband amount:
operating a drive motor of the vehicle to provide an amount regenerative braking to a tractive element of the vehicle based on the amount of depression of the pedal;
responsive to the amount of depression being greater than the transition point by at least the deadband amount:
operating the drive motor of the vehicle to drive the tractive element of the vehicle to transport the vehicle based on the amount of depression of the pedal.

16. The method of claim 15, wherein:
operating the drive motor of the vehicle to provide the amount of regenerative braking comprises:
using a non-linear relationship and the amount of depression of the pedal to determine a requested amount of regenerative braking and operating the drive motor according to a regenerative braking mode to provide the requested amount of regenerative braking; and
operating the drive motor of the vehicle to drive the tractive element comprises:
using a linear relationship and the amount of depression of the pedal to determine a requested amount of acceleration and operating the drive motor according to a drive mode to provide the requested amount of acceleration for transportation.

* * * * *